(12) United States Patent
Drayton

(10) Patent No.: US 11,186,386 B2
(45) Date of Patent: Nov. 30, 2021

(54) AUTOMATED AIRCRAFT INSPECTION SYSTEM

(71) Applicant: The Boeing Company, Chicago, IL (US)

(72) Inventor: Ralph D. Drayton, Rancho Cucamonga, CA (US)

(73) Assignee: The Boeing Company, Chicago, IL (US)

( * ) Notice: Subject to any disclaimer, the term of this patent is extended or adjusted under 35 U.S.C. 154(b) by 378 days.

(21) Appl. No.: 16/381,191

(22) Filed: Apr. 11, 2019

(65) Prior Publication Data

US 2020/0324919 A1    Oct. 15, 2020

(51) Int. Cl.
| | |
|---|---|
| *B64F 5/60* | (2017.01) |
| *B64D 45/00* | (2006.01) |
| *G01M 5/00* | (2006.01) |
| *G01N 21/88* | (2006.01) |

(52) U.S. Cl.
CPC .............. *B64F 5/60* (2017.01); *B64D 45/00* (2013.01); *G01M 5/0016* (2013.01); *G01N 21/8851* (2013.01); *G01N 2201/102* (2013.01)

(58) Field of Classification Search
CPC ..... B64F 5/60; B64D 45/00; G01N 2201/102; G01N 21/8851; G01M 5/0016
See application file for complete search history.

(56) References Cited

U.S. PATENT DOCUMENTS

| | | | | |
|---|---|---|---|---|
| 4,168,814 A | * | 9/1979 | Bird | B64F 5/60 244/1 R |
| 8,255,170 B2 | * | 8/2012 | Kollgaard | G06F 11/2294 702/34 |
| 2016/0244186 A1 | * | 8/2016 | Brown | B64D 9/003 |
| 2016/0370798 A1 | | 12/2016 | Georgeson et al. | |
| 2020/0102097 A1 | * | 4/2020 | Yann | B64F 5/10 |

OTHER PUBLICATIONS

GE Digital Solutions, "Remote Visual Inspection—More reliable inspections, for the most confidence." accessed Apr. 4, 2019, copyright 2019, 7 pages. https://www.gemeasurement.com/inspection-ndt/remote-visual-inspection.

(Continued)

*Primary Examiner* — Mathew Franklin Gordon
(74) *Attorney, Agent, or Firm* — Yee & Associates, P.C.

(57) ABSTRACT

A method, apparatus, and system for inspecting a fuselage of an aircraft. A rail is positioned within an interior portion of the fuselage of the aircraft such that the rail extends through the interior portion of the fuselage. An inspection device is attached to the rail. The inspection device moves along the rail and the position of the rail enables the inspection device to inspect the interior portion. Video data is sent to a computer system over a wireless communications link between the inspection device and the computer system. The video data is displayed on a display system for the computer system. Inspection operations are performed in the interior portion of the fuselage with the inspection device attached to the rail when a group of commands to perform the inspection operations are received from the computer system over a wireless communications link between the inspection device and the computer system.

23 Claims, 14 Drawing Sheets

(56) References Cited

OTHER PUBLICATIONS

Liberstream, "Remote Aircraft Maintenance and Inspections," accessed Apr. 4, 2019, copyright 2019, 8 pages. https://librestream.com/solutions/aircraft-maintenance-inspections.

SGS, "Remote Visual Inspection: Advanced Visual Inspection of Difficult Accessible Areas," Mar. 2010, 2 pages. https://www.sgs.com/en/industrial-manufacturing/services-related-to-production-andproducts/materials-testing/non-destructive-testing-ndt.

Awsi, "Virtual Reality, Maintenance and Inspection, and The AWSI Demonstrator," August-Wilhelm Scheer Institut fur digitale Produkte und Prozesse, Aug. 2018, accessed Apr. 4, 2019, 10 pages. https://www.aws-institut.de/virtual-remote-maintenance-inspection/?lang=en.

* cited by examiner

AUTOMATED AIRCRAFT INSPECTION SYSTEM

BACKGROUND INFORMATION

1. Field

The present disclosure relates generally to aircraft and in particular, to a method, apparatus, and system for inspecting the interior of a fuselage of an aircraft.

2. Background

Aircraft inspections can take a number of different forms. For example, nondestructive examination in the form of nondestructive testing (NDT) can be performed on an aircraft. This type of testing can be performed both during manufacturing of the aircraft and during maintenance of the aircraft after delivery of the aircraft to a customer.

Nondestructive testing can include, for example, eddy current testing, magnetic particle testing, radiographic testing, ultrasonic testing, and visual testing. For example, visual inspections can be performed by a human inspector on the exterior and interior of an aircraft to look for nonconformances. A visual inspection can be performed using a number of different inspection tools. For example, the inspection tools used by the human inspector can include at least one of magnification devices, borescopes, cameras, and handheld microscopes, or other optical devices that can be used to inspect aircraft structures.

The visual inspection can be performed to identify nonconformances in an aircraft. These nonconformances can include at least one of an out of tolerance fit between parts, a missing fastener, a delamination, a crack, corrosion, a skin bulge, a scratch, a dent, warping, or other types of nonconformances.

The visual inspection is performed by a human inspector that has training and experience in performing visual inspections on aircraft. Currently, the inspector travels to the location of the aircraft and performs a visual inspection by moving around the outside of the aircraft, the inside of the aircraft, or both.

If the inspector locates a nonconformance on the aircraft, the inspector can place a marker on the aircraft on or near the location of the nonconformance. The inspector can mark the location of the nonconformance with a tape, an ink, a paint, or some other type of marker. Further, the inspector can record the locations of nonconformances found along with descriptions of the nonconformances.

This type of process can be more time-consuming than desired when the number of inspectors available to perform visual inspections at different locations is limited. Consequently, an aircraft may be out of service longer than desired with difficulties in scheduling an inspector to perform an inspection of the aircraft.

Therefore, it would be desirable to have a method and apparatus that take into account at least some of the issues discussed above, as well as other possible issues. For example, it would be desirable to have a method and apparatus that overcome a technical problem with the manner in which inspections such as visual inspections are currently performed on aircraft.

SUMMARY

An embodiment of the present disclosure provides a method for inspecting a fuselage of an aircraft. A rail is positioned within an interior portion of the fuselage of the aircraft such that the rail extends through the interior portion of the fuselage. An inspection device is attached to the rail. The inspection device moves along the rail, and a position of the rail enables the inspection device to inspect the interior portion. Video data is sent to a computer system over a wireless communications link between the inspection device and the computer system. The video data is displayed on a display system for the computer system. Inspection operations are performed in the interior portion of the fuselage with the inspection device attached to the rail when a group of commands to perform the inspection operations is received from the computer system over a wireless communications link between the inspection device and the computer system.

Another embodiment of the present disclosure provides an aircraft inspection system comprising a rail, a mounting system, an inspection device, and a computer system. The mounting system holds the rail in a position within an interior portion of a fuselage of an aircraft such that the rail extends through the interior portion of the fuselage. The inspection device is moveably attached to the rail, wherein the inspection device is linearly moveable along the rail and rotatably moveable about the rail and wherein the inspection device operates to generate sensor data in response to receiving a group of commands. The computer system is in a location remote to the inspection device. The computer system is in communication with the inspection device wherein the computer system receives video data from the inspection device, displays the video data on a display system, generates the group of commands based on a user input received from a human operator at the computer system, sends the group of commands to the inspection device, and receives sensor data from the inspection device.

Yet another embodiment of the present disclosure provides an aircraft inspection system comprising a rail, a mounting system, and an inspection device. The mounting system holds the rail in a position within an interior portion of a fuselage of an aircraft such that the rail extends through the interior portion of the fuselage. The inspection device is moveably attached to the rail. The inspection device is linearly moveable along the rail and rotatably moveable about the rail. The inspection device operates to generate sensor data for the interior portion of the fuselage.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

The illustrative embodiments recognize and take into account one or more different considerations. For example, the illustrative embodiments recognize and take into account that a limited number of inspectors, with training, experience, or both in inspecting aircraft, are available to travel to locations where aircraft are located to perform inspections. The illustrative embodiments recognize and take into account that with this situation, the amount of time needed to inspect an aircraft or inspect parts for an aircraft can be greater than desired when scheduling inspectors to travel to locations for inspections. The illustrative embodiments recognize and take into account that with this situation, aircraft may be out of service for maintenance longer than desired. The illustrative embodiments recognize and take into account that enabling remote inspections in which it is unnecessary for inspectors to travel to each site for inspections can reduce the need for additional inspectors, reduce inspection cycle time, increase aircraft availability, reduce maintenance down time, or some combination thereof.

Figure 1:
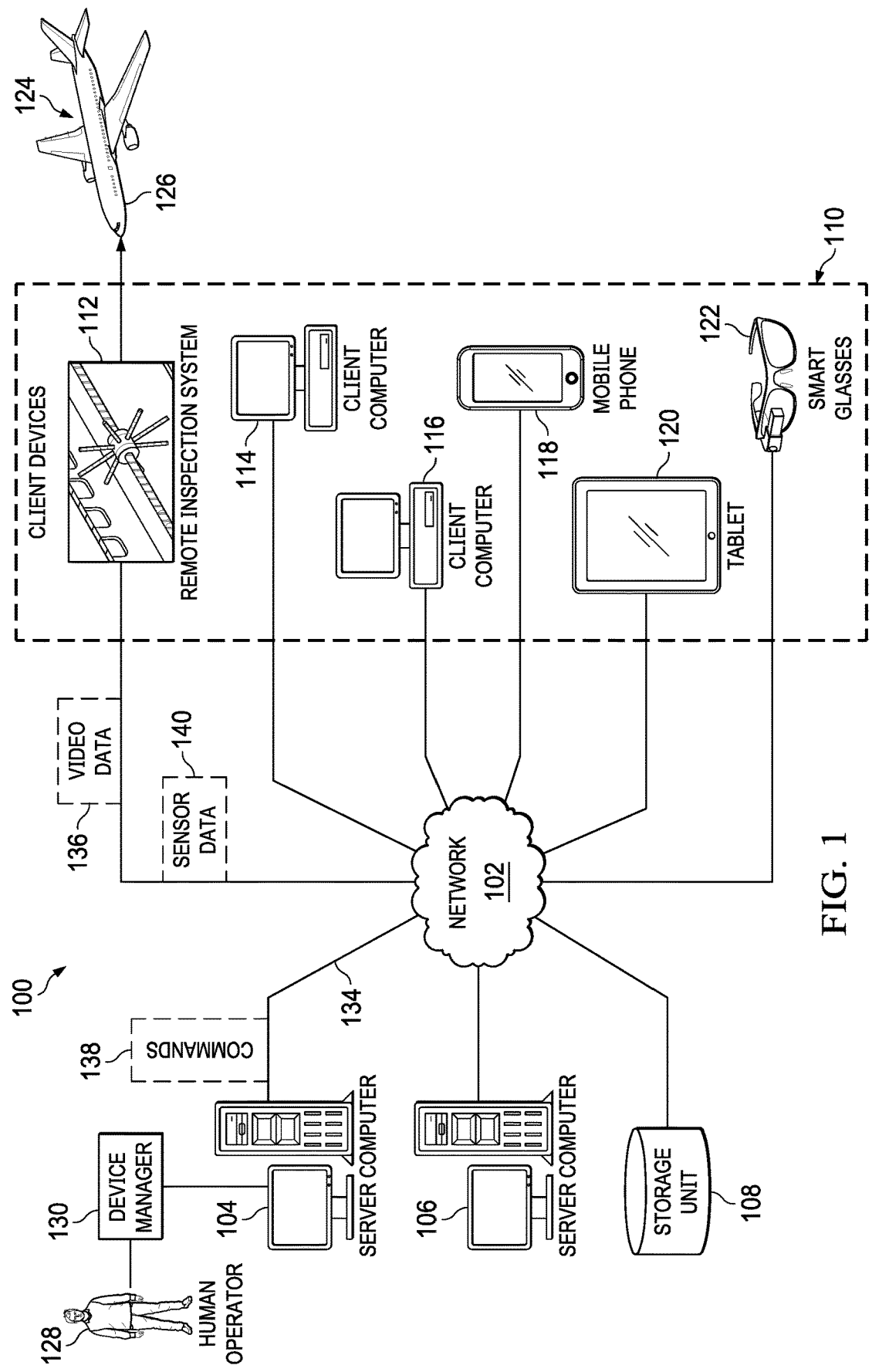
FIG. 1 is an illustration of a pictorial representation of a network of data processing systems in which illustrative embodiments may be implemented.

With reference now to the figures and, in particular, with reference to FIG. 1, an illustration of a pictorial representation of a network of data processing systems is depicted in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server computer 104 and server computer 106 connect to network 102 along with storage unit 108. In addition, client devices 110 connect to network 102. As depicted, client devices 110 include remote inspection system 112, client computer 114, and client computer 116. Client devices 110 can be, for example, computers, workstations, or network computers. In the depicted example, server computer 104 provides information, such as boot files, operating system images, and applications to client devices 110. Further, client devices 110 can also include other types of client devices such as mobile phone 118, tablet computer 120, and smart glasses 122. In this illustrative example, server computer 104, server computer 106, storage unit 108, and client devices 110 are network devices that connect to network 102 in which network 102 is the communications media for these network devices. Some or all of client devices 110 may form an Internet of things (IoT) in which these physical devices can connect to network 102 and exchange information with each other over network 102.

Client devices 110 are clients to server computer 104 in this example. Network data processing system 100 may include additional server computers, client computers, and other devices not shown. Client devices 110 connect to network 102 utilizing at least one of wired, optical fiber, or wireless connections.

Program code located in network data processing system 100 can be stored on a computer-recordable storage medium and downloaded to a data processing system or other device for use. For example, program code can be stored on a computer-recordable storage medium on server computer 104 and downloaded to client devices 110 over network 102 for use on client devices 110.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers consisting of thousands of commercial, governmental, educational, and other computer systems that route data and messages. Of course, network data processing system 100 also may be implemented using a number of different types of networks. For example, network 102 can be comprised of at least one of the Internet, an intranet, a local area network (LAN), a metropolitan area network (MAN), or a wide area network (WAN). FIG. 1 is intended as an example, and not as an architectural limitation for the different illustrative embodiments.

As used herein, "a number of" when used with reference to items, means one or more items. For example, "a number of different types of networks" is one or more different types of networks.

Further, the phrase "at least one of," when used with a list of items, means different combinations of one or more of the listed items can be used, and only one of each item in the list may be needed. In other words, "at least one of" means any combination of items and number of items may be used from the list, but not all of the items in the list are required. The item can be a particular object, a thing, or a category.

For example, without limitation, "at least one of item A, item B, or item C" may include item A, item A and item B, or item B. This example also may include item A, item B, and item C or item B and item C. Of course, any combinations of these items can be present. In some illustrative examples, "at least one of" can be, for example, without limitation, two of item A; one of item B; and ten of item C; four of item B and seven of item C; or other suitable combinations.

In this illustrative example, remote inspection system 112 can be installed in aircraft 124 to perform inspection of aircraft 124. As depicted, remote inspection system 112 can be installed in the interior of fuselage 126 of aircraft 124. The installation can be performed by human operators who are not trained or experienced in visual inspections.

As depicted, human operator 128 interacts with device manager 130 running on server computer 104 to control the operation of remote inspection system 112. In this illustrative example, human operator 128 has at least one of training or experience in performing inspections on aircraft.

Human operator 128 and server computer 104 are in a remote location to remote inspection system 112 installed in fuselage 126 of aircraft 124. A remote location is a location in which human operator 128 is not in the interior portion of fuselage 126 of aircraft 124. Human operator 128 can be in a different building, city, state, or other geographic location from aircraft 124. For example, human operator 128 can be in a maintenance building for a maintenance provider while aircraft 124 can be in a maintenance hanger for an airline.

In this depicted example, remote inspection system 112 has wireless communications link 132 to network 102. Wireless communications link 132 can be establish using WiFi signals, cellular signals, or other types of wireless signals. Server computer 104 has wired communications link 134 to network 102 in this depicted example. In other illustrative examples, remote inspection system 112 can have a wired communications link and server computer 104 can have a wireless communications link.

As depicted, remote inspection system 112 sends video data 136 to device manager 130 which displays video data 136 on a display device in server computer 104 to human operator 128. Video data 136 is displayed to provide a live view of the interior of fuselage 126.

In this illustrative example, device manager 130 can also display information on the live view displayed using video data 136 to provide an augmented reality display to human operator 128. The information can include at least one of schematics, wiring diagrams, inspection instructions, work orders, graphical indicators identifying nonconformances, or other suitable information that can be viewed by human operator 128 for use in performing an inspection of fuselage 126 from the remote location.

In this illustrative example, human operator 128 performs a visual inspection on fuselage 126 of aircraft 124. In other illustrative examples, human operator 128, controlling the operation of remote inspection system 112, can perform visual inspections, x-ray inspections, ultrasound inspections, eddy current inspections, or other suitable types of inspections in fuselage 126 of aircraft 124.

Human operator 128 performs the inspection remotely from aircraft 124 through user input sent to device manager 130. Device manager 130 generates a group of commands 138 from the user input. Device manager 130 sends the group of commands 138 to remote inspection system 112 and causes remote inspection system 112 to perform operations to inspect fuselage 126 of aircraft 124. Remote inspection system 112 sends sensor data 140 to device manager 130.

Figure 2:
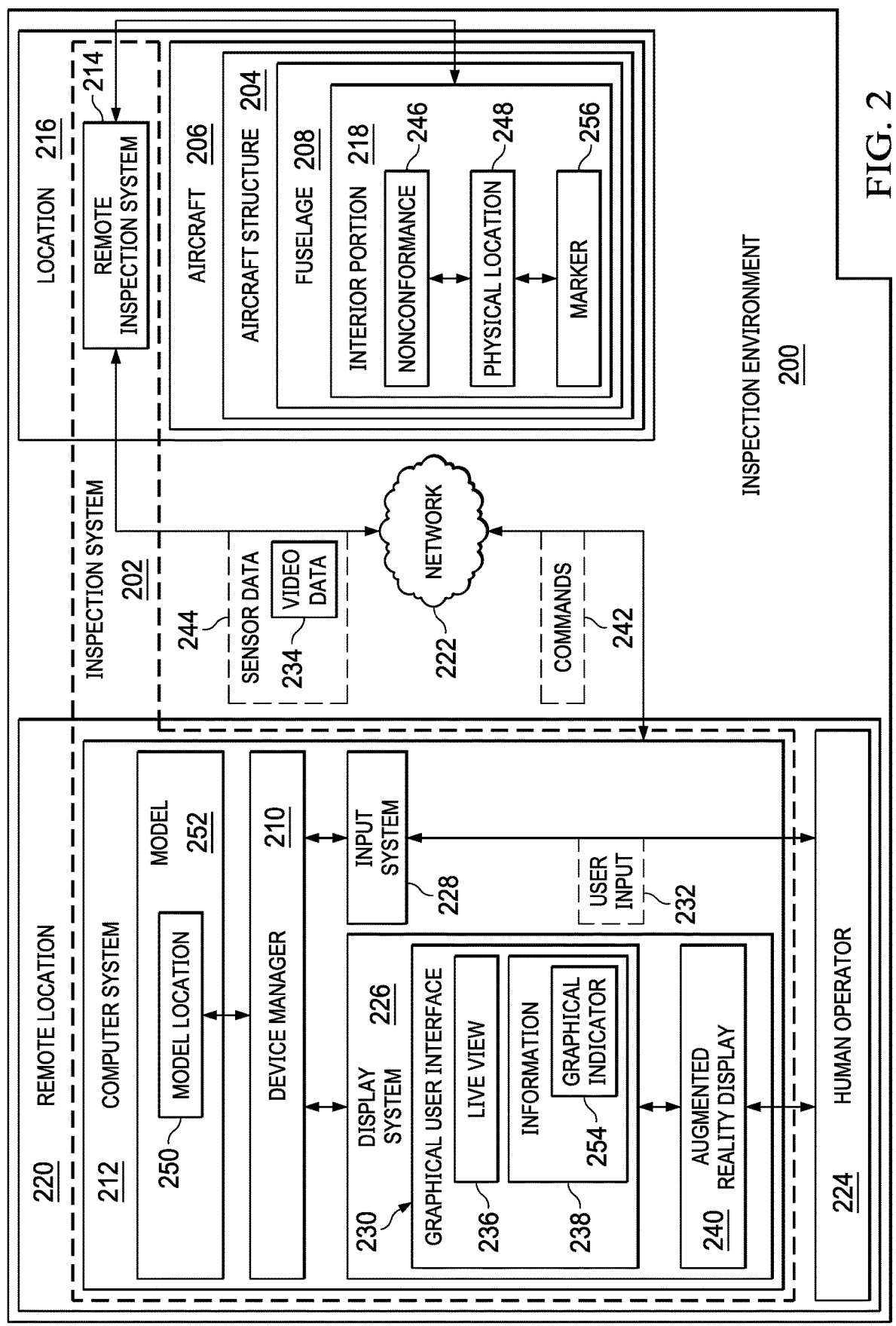
FIG. 2 is an illustration of a block diagram of an inspection environment in accordance with an illustrative embodiment.

With reference now to FIG. 2, an illustration of a block diagram of an inspection environment is depicted in accordance with an illustrative embodiment. In this illustrative example, inspection environment 200 includes components that can be implemented in hardware such as the hardware shown in network data processing system 100 in FIG. 1.

In inspection environment 200, inspection system 202 operates to inspect aircraft structure 204 in aircraft 206. Inspection system 202 can also be referred to as an aircraft inspection system. Aircraft 206 can take a number of different forms. For example, aircraft 206 can be selected from a group comprising an airplane, a cargo plane, a commercial passenger jet, a regional jet, a narrow body aircraft, a fuel tanker, a wide-body airliner or other suitable types of aircraft.

The inspection of aircraft structure 204 can take place during a number of different stages in the lifecycle of aircraft 206. For example, aircraft structure 204 can be inspected during manufacturing of aircraft structure 204 prior to aircraft structure 204 being assembled with other aircraft structures. In other illustrative examples, aircraft structure 204 can be located in aircraft 206 which has been delivered to a customer for use. The inspection of aircraft structure 204 can take place as part of maintenance for aircraft 206. In this illustrative example, aircraft structure 204 is fuselage 208 of aircraft 206.

In this example, fuselage 208 can be the entire fuselage that forms aircraft 206. In some illustrative examples, fuselage 208 is a fuselage section that can be connected to other fuselage sections to form an entire fuselage for aircraft 206.

In this illustrative example, inspection system 202 comprises a number of different components. As depicted, inspection system 202 includes device manager 210 in computer system 212 and remote inspection system 214.

Remote inspection system 112 is a physical hardware system and can include software components. In this illustrative example, remote inspection system 214 is located in location 216 and can be installed in fuselage 208 to perform inspections of fuselage 208 of aircraft 206 in location 216. Location 216 can be, for example, a maintenance facility, an aircraft manufacturing factory, a hanger, or some other suitable location in which inspection of fuselage 208 can be made.

In this illustrative example, remote inspection system 214 can be installed within interior portion 218 of fuselage 208 of aircraft 206. Interior portion 218 can be one of a passenger area, a cargo area, or some other suitable area in the interior of fuselage 208. The installation of remote inspection system 214 is a temporary installation for purposes of performing an inspection on interior portion 218 of fuselage 208. After the inspection is completed, remote inspection system 214 can be removed from interior portion 218 of fuselage 208. The installation and removal of remote inspection system 214 does not require a human operator that is skilled, trained, or experienced in performing inspections.

As depicted, computer system 212 is in remote location 220 while remote inspection system 214 is in location 216. Remote inspection system 214 and computer system 212 communicate with each other through network 222. Network 222 can be comprised of at least one of the Internet, an intranet, a local area network (LAN), a metropolitan area network (MAN), or a wide area network (WAN), or some other suitable network data or communications medium.

As depicted, remote inspection system 214 connects to network 222 via wireless communications links. In some illustrative examples, a wired or optical communications link can be used by remote inspection system 214 to connect to network 222.

Computer system 212 is a physical hardware system and includes one or more data processing systems. When more than one data processing system is present in computer system 212, those data processing systems are in communication with each other using a communications medium. The communications medium can be a network. The data processing systems can be selected from at least one of a computer, a server computer, a tablet computer, or some other suitable data processing system.

As depicted, computer system 212 connects to network 222 by a physical communications link such as a wired link or optical link. In some examples, a wireless link can also be used.

In this illustrative example, human operator 224 controls the operation of remote inspection system 214 using computer system 212 at remote location 220. Remote location 220 and location 216 are physically different locations. These locations can be, for example, in different buildings in the same facility, different areas in the same building, in different facilities, different cities, different cities, different counties, or different continents. For example, location 216 can be a maintenance hangar for an airline in one state while remote location 220 is an office building for an aircraft manufacturer in a different state.

Human operator 224 interacts with device manager 210 in computer system 212 to remotely operate remote inspection system 214. As depicted, the interaction occurs using display system 226 and input system 228 for computer system 212.

As depicted, display system 226 is a physical hardware system and includes one or more display devices on which graphical user interface 230 can be displayed. The display devices may include at least one of a light emitting diode (LED) display, a liquid crystal display (LCD), an organic light emitting diode (OLED) display, a computer monitor, a projector, a flat panel display, a heads-up display (HUD, or some other suitable device that can output information for the presentation of information.

In this illustrative example, display system 226 is configured to display graphical user interface 230 for device manager 210. Human operator 224 is a person that can interact with graphical user interface 230 through user input 232 generated by input system 228 for computer system 212. Input system 228 is a physical hardware system and can be selected from at least one of a mouse, a keyboard, a trackball, a touchscreen, a stylus, a motion sensing input device, a cyber glove, or some other suitable type of input device.

Device manager 210 can be implemented in software, hardware, firmware or a combination thereof. When software is used, the operations performed by device manager 210 can be implemented in program code configured to run on hardware, such as a processor unit. When firmware is used, the operations performed by device manager 210 can be implemented in program code and data and stored in persistent memory to run on a processor unit. When hardware is employed, the hardware can include circuits that operate to perform the operations in device manager 210.

In the illustrative examples, the hardware can take a form selected from at least one of a circuit system, an integrated circuit, an application specific integrated circuit (ASIC), a programmable logic device, or some other suitable type of hardware configured to perform a number of operations. With a programmable logic device, the device can be configured to perform the number of operations. The device can be reconfigured at a later time or can be permanently configured to perform the number of operations. Programmable logic devices include, for example, a programmable logic array, a programmable array logic, a field programmable logic array, a field programmable gate array, and other suitable hardware devices. Additionally, the processes can be implemented in organic components integrated with inorganic components and can be comprised entirely of organic components excluding a human being. For example, the processes can be implemented as circuits in organic semiconductors.

During the operation of inspection system 202, computer system 212 is in communication with remote inspection system 214. Device manager 210 in computer system 212 receives video data 234 from remote inspection system 214 and displays video data 234 on display system 226 for computer system 212. This display of video data 234 provides human operator 224 with live view 236 of interior portion 218 of fuselage 208 of aircraft 206.

In one illustrative example, device manager 210 displays live view 236 of fuselage 208 and information 238 on display system 226 as an augmented reality display 240 of fuselage 208. As depicted, information 238 is for use in inspecting fuselage 208 and can take a number of different forms. For example, information 238 can be selected from at least one of one of a diagram of components in fuselage 208, a portion of a model of the fuselage, a work order, a prior scan of the fuselage, a graphical indicator on an inspection location in the interior portion of fuselage 208, or other suitable information that can be utilized in inspecting interior portion 218 of fuselage 208.

As depicted, device manager 210 generates commands 242 based on user input 232 received from human operator 224 at computer system 212 in remote location 220. In the illustrative example, commands 242 are for use by remote inspection system 214 to perform inspection operations. In this illustrative example, device manager 210 sends commands 242 to remote inspection system 214 and receives sensor data 244 from the remote inspection system 214.

In the illustrative example, sensor data 244 can be the same data as video data 234 if the inspection being performed is a visual inspection. The depending the type of inspection, other types of sensor data 244 may be received. For example, at least one of x-ray data from x-ray devices, voltages from eddy current sensors, or other types of sensor data 244 can make up sensor data 244 depending on the type of tools used in remote inspection system 214 to perform inspection of interior portion 218 of fuselage 208. This data can be viewed by human operator 224, analyzed in computer system 212, stored, or otherwise used as part of the inspection process of fuselage 208.

As depicted, human operator 224 can perform a visual inspection on fuselage 208. Human operator views live view 236 displayed on display system 226 using video data 234. When human operator 224 sees nonconformance 246 at physical location 248 in interior portion 218 of fuselage 208 on live view 236, human operator 224 can generate user input 232 to mark nonconformance 246.

In one illustrative example, device manager 210 receives user input 232 to mark nonconformance 246 in live view 236 of fuselage 208. For example, human operator 224 can move a pointer over physical location 248 seen in live view 236 and generate user input 232 to mark physical location 248.

For example, device manager 210 can identify model location 250 in model 252 of 208 fuselage that corresponds to physical location 248 of nonconformance 246 marked in live view 236 of fuselage 208. Device manager 210 associates graphical indicator 254 with model location 250 in model 252. Further, device manager 210 can display graphical indicator 254 on physical location 248 in live view 236 as information 238 for augmented reality display 240 for human operator 224.

Model location 250 can later be used to guide personnel to physical location 248 in interior portion 218 of fuselage 208 for performing additional operations. These additional operations can include at least one of an onsite visual inspection, rework, and component replacement, or other operations to resolve nonconformance 246.

In another illustrative example, in response to receiving user input 232 to mark nonconformance 246 at physical location 248 of live view 236 of fuselage 208, device manager 210 can generate a command in commands 242 to place marker 256 at physical location 248 on fuselage 208 that corresponds to physical location 248 of nonconformance 246 marked in live view 236 of interior portion 218 of fuselage 208. In this example, device manager 210 sends the command to remote inspection system 214 such that remote inspection system 214 places marker 256 on interior portion 218 of fuselage 208 at physical location 248. In other words, marker 256 is a physical marker.

In this illustrative example, marker 256 is a physical object and can take a number of different forms. For example, marker 256 can be a tape, a sticky note, an ink, a paint, a radio frequency identifier device, or some other type of physical indicator that can be physically placed on physical location 248 in interior portion 218 of fuselage 208.

Figure 3:
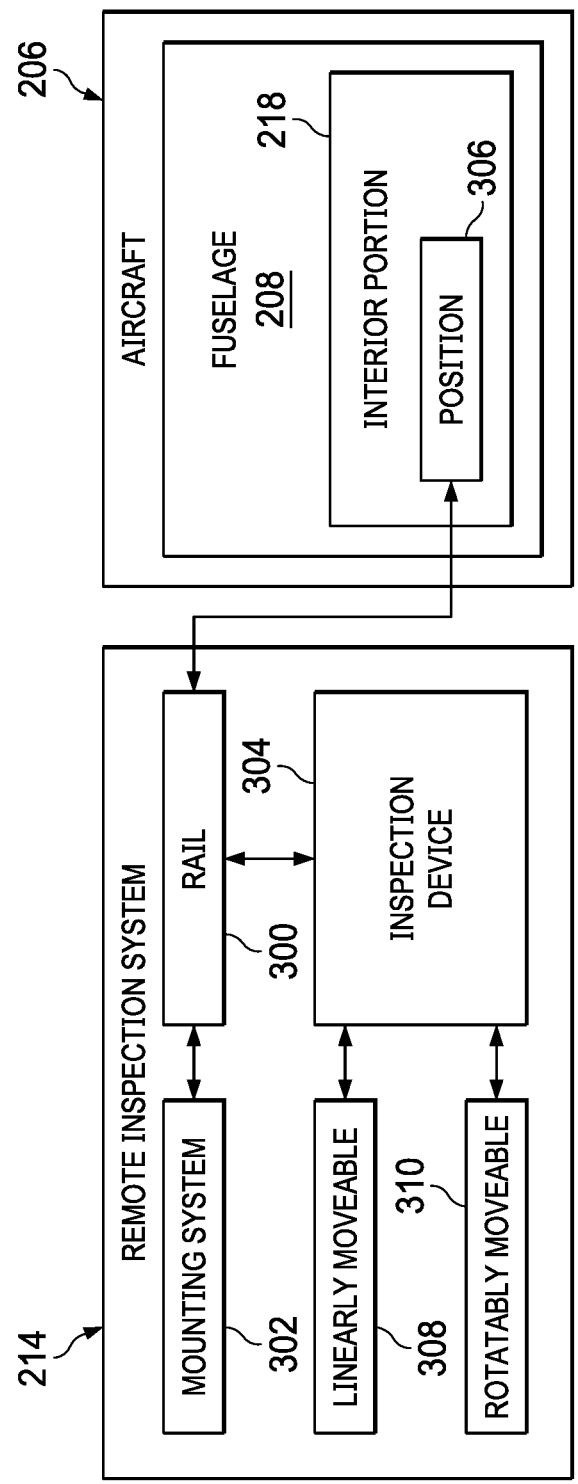
FIG. 3 is an illustration of a block diagram of a remote inspection system in accordance with an illustrative embodiment.

With reference now to FIG. 3, an illustration of a remote inspection system is depicted in accordance with an illustrative embodiment. In the illustrative examples, the same reference numeral may be used in more than one figure. This reuse of a reference numeral in different figures represents the same element in the different figures.

An example of components that can be used in remote inspection system 214 is depicted in this figure. In this example, remote inspection system 214 comprises rail 300, mounting system 302, and inspection device 304.

Rail 300 is a physical component on which an inspection device 304 can move. In the illustrative example, rail 300 can take a number of different forms. For example, rail 300 can be selected from one of a rod with a helical groove, a track, a bar, a linear gear, or other suitable elongate member.

In this illustrative example, mounting system 302 is a physical system and is configured to hold rail 300 in position 306 within interior portion 218 of fuselage 208 of aircraft 206 in position 306 such that rail 300 extends through interior portion 218 of fuselage 208. For example, position 306 can be such that rail 300 extends centrally through interior portion 218 of fuselage 208.

Mounting system 302 can be connected to at least one of fuselage 208 or a structure in an inspection area in location 216 in which fuselage 208 is located such that rail 300 has position 306 that extends through interior portion 218 of fuselage 208. Mounting system 302 can include at least one of a stand, a sawhorse, a tripod, a tether, a bracket, a strap, a harness, a frame, a platform, or some other structure that capable of supporting rail 300.

In the illustrative example, rail 300 can be connected to mounting system 302 in a number of different ways. For example, the ends of rail 300 can be connected to mounting system 302, the middle of rail 300 can be connected to mounting system 302, or some other part or parts of rail 300 can be connected to mounting system 302.

As depicted, inspection device 304 is a physical system and can include computing devices and software. Inspection device 304 is moveably attached to rail 300. For example, inspection device 304 can be at least one of linearly moveable 308 along the rail or rotatably moveable 310 about rail 300.

In this illustrative example, inspection devices 304 receives commands 242 from device manager 210. As depicted, commands 242 are selected from at least one of move inspection device 304 along rail 300, rotate inspection device 304 about rail 300, activate a tool connected to inspection device 304 to perform a test, move the tool towards a wall of fuselage 208, move the tool away from a wall of fuselage 208, or send sensor data 244 to computer system 212. For example, move the tool towards or away from the wall can be performed by changing the length of a telescoping rod on which the tool is connected.

Thus, inspection device 304 can operate to generate sensor data 244 in response to receiving commands 242. Additionally, inspection device 304 can also move within interior portion 218 in response to commands 242.

Figure 4:
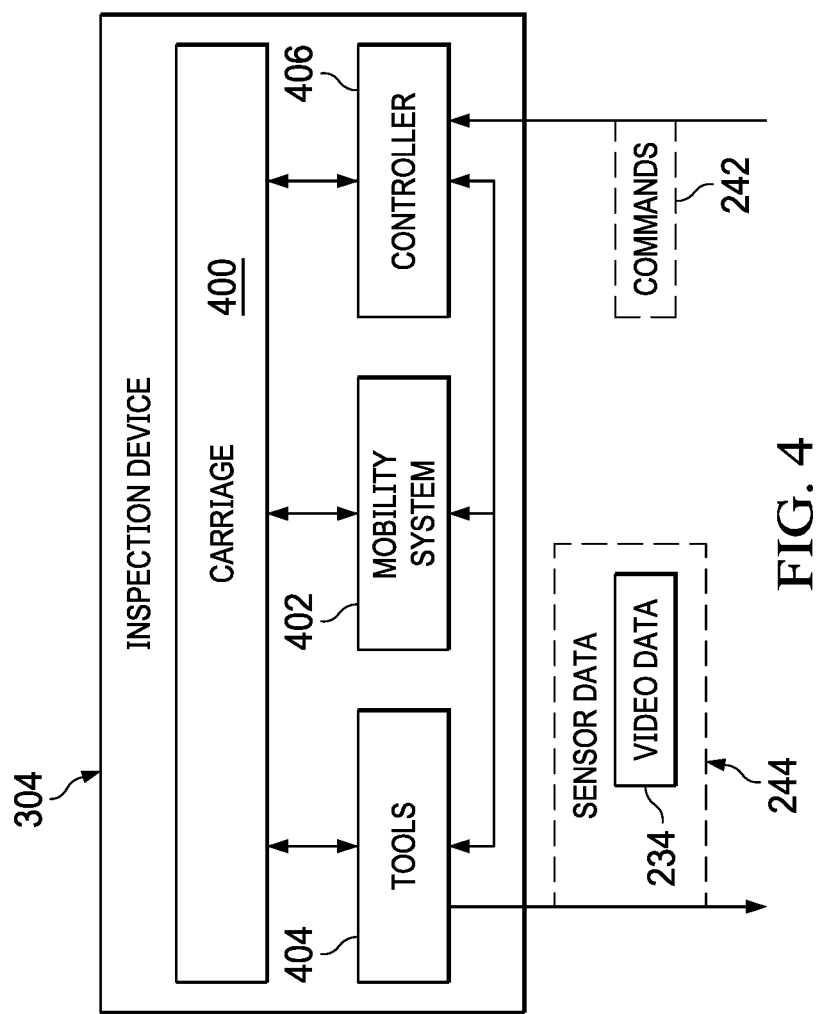
FIG. 4 is an illustration of a block diagram of an inspection device in accordance with an illustrative embodiment.

With reference next FIG. 4, an illustration of a block diagram of an inspection device is depicted in accordance with an illustrative embodiment. This figure illustrates an example of components for inspection device 304 in FIG. 3. In this illustrative example, inspection device 304 comprises carriage 400, mobility system 402, a group of inspection tools 404, and controller 406.

As used herein, a group of items is one or more items. For example, a group of inspection tools 404 is one or more of inspection tools 404.

As depicted, carriage 400 is a physical structure that provides a platform for other components in inspection device 304. Carriage 400 can be a frame, a body, a housing, or some other components. Carriage 400 can be linearly movable along rail 300 and can also be rotatably movable about rail 300.

In this example, carriage 400 is movably attached to rail 300 through mobility system 402. Mobility system 402 is a physical system and provides for the mobility of carriage 400 on rail 300. Mobility system 402 can move carriage 400 along rail 300 or rotate about rail 300. In other words, carriage 400 can rotate about an axis extending through rail 300. In this illustrative example, mobility system 402 can include at least one of a propulsion system, a steering system, a braking system, and other mobility components such as wheels or guides.

As depicted, the group of inspection tools 404 is one or more physical tools that generate sensor data 244 that can be analyzed as part of inspecting fuselage 208. The sensor data can include video data 234. The group of inspection tools 404 is selected from at least one of a visible light camera, an x-ray system, an ultrasound transducer array, a thermographic camera, an eddy current probe, or some other suitable type of tool.

In this illustrative example, controller 406 is a physical hardware device and can include software. For example, controller 406 can be implemented using a data processing system, a computer, a card, a chip, or standalone device that can communicate with a set of peripheral devices. In this depicted example, the set of peripheral devices includes mobility system 402 and the group of inspection tools 404.

Thus, controller 406 controls the operation of inspection device 304 including the mobility system 402 and the group of inspection tools 404. For example, controller 406 can receive commands 242.

Controller 406 includes communications components such as a radio frequency transceiver or other suitable communications components that enable receiving commands 242 and transmitting sensor data 244 generated by the group of inspection tools 404. Controller 406 processes commands 242 to perform operations such as activating and generating sensor data 244 using the group of inspection tools 404.

Further, controller 406 can also process commands 242 to control the positioning and movement of carriage 400 on rail 300. For example, controller 406 can control mobility system 402 to cause carriage 400 to move along rail 300. Further, controller 406 can also control mobility system 402 to rotate carriage 400. This rotation of carriage 400 causes rotation of the group of inspection tools 404 to enable inspecting interior portion 218 of fuselage 208 without having to disassemble, move, and reassemble rail 300 and inspection device 304 to inspect interior portion 218 of fuselage 208.

In this manner, the different components of inspection device 304 can operate to perform a 360 degree inspection along an axis through fuselage 208. In the illustrative example, rail 300 can be positioned centrally within interior portion 218 of fuselage 208. For example, rail 300 can be positioned in the middle the fuselage above or below the floor line.

In one illustrative example, one or more technical solutions are present that overcome a technical problem with the manner in which inspections such as visual inspections are currently performed on aircraft when a limited number of inspectors with training, experience, or both are available to travel to the locations where aircraft maintenance or aircraft manufacturing occurs to perform visual inspection of aircraft. In the illustrative example, one or more technical solutions can provide a technical effect reducing or eliminating travel time needed by an inspector to inspect aircraft.

In the illustrative example, one or more technical solutions are present in which an inspector can remotely inspect an aircraft using remote inspection system 214. Remote inspection system 214 can be assembled and installed by personnel at the location. These personnel do not need to have experience or training in performing inspection operations. The inspector can operate inspection device 304 in remote inspection system 214 and perform inspection operations without needing to be present the location fuselage to perform the inspection.

Computer system 212 can be configured to perform at least one of the steps, operations, or actions described in the different illustrative examples using software, hardware, firmware or a combination thereof. As a result, computer system 212 operates as a special purpose computer system in which device manager 210 in computer system 212 enables human operator 224 to operate remote inspection system 214 to remotely inspect fuselage 208. In particular, device manager 210 transforms computer system 212 into a special purpose computer system as compared to currently available general computer systems that do not have the device manager 210.

The illustration of inspection environment 200 and the different components in FIGS. 2-4 is not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, although the inspection of aircraft structure 204 has been described with reference to fuselage 208, aircraft structure can take other forms in other implementations. As another example, aircraft structure 204 can be any structure for aircraft 206 that has an interior cavity in which remote inspection system 214 can be installed. For example, aircraft structure 204 can also take the form of a wing box that can be inspected during manufacturing of aircraft 206.

In yet another example, remote inspection system 214 can include one or more inspection devices in addition to inspection device 304. With this illustrative example, the additional inspection devices can be controlled by human operator 224. In some illustrative examples, additional human operators can be assigned to control the operation of the additional inspection devices.

Figure 5:
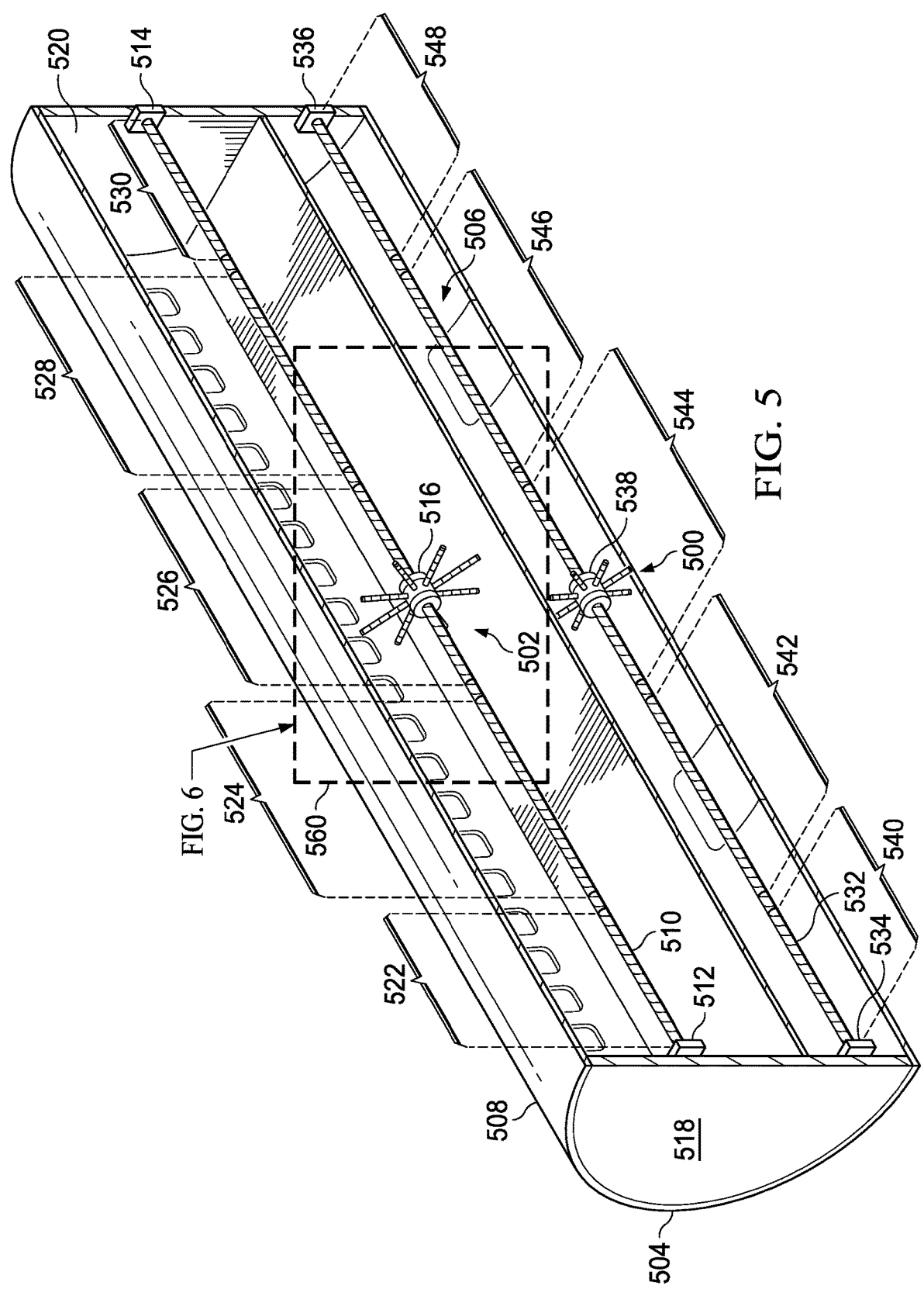
FIG. 5 is an illustration of remote inspection systems installed in a fuselage of an aircraft in accordance with an illustrative embodiment.

Turning to FIG. 5, an illustration of remote inspection systems installed in a fuselage of an aircraft is depicted in accordance with an illustrative embodiment. As depicted, remote inspection system 500 and remote inspection system 502 are installed within fuselage 504. Remote inspection system 502 is installed within interior portion 506 that is a passenger area in fuselage 504. Remote inspection system 502 is installed in interior portion 508 that is a cargo area in fuselage 504.

As depicted, remote inspection system 500 in interior portion 506 of fuselage 504 comprises helical rod 510 connected to plate 512 and plate 514. Helical rod 510 is an example of a physical implementation of rail 300 shown in block form in FIG. 3. In this illustrative example, helical rod 510 is comprised of section 522, section 524, section 526, section 528, and section 530 joined together to form helical rod 510.

Plate 512 is connected to bulkhead 518, and plate 514 is connected to bulkhead 520. Plate 512 and plate 514 are examples of physical components for mounting system 302 shown in block form in FIG. 3. These plates can be connected to bulkhead 518 and bulkhead 520 using fasteners or other types of connecting mechanisms. As depicted in this example, helical rod 510 is centrally located within interior portion 506.

Inspection device 516 is connected to helical rod 510. Inspection device 516 is an example of an implementation for inspection device 304 shown in block form in FIG. 3.

As depicted, inspection device 516 is configured to move along helical rod 510 while performing inspection operations to generate sensor data. Further, inspection device 516 is also configured to rotate about helical rod 510 to perform inspection operations to generate sensor data. Inspection device 516 can rotate to position a tool and cause the tool to operate to generate sensor data or can rotate while the tool operates to generate sensor data.

As depicted, remote inspection system 502 in interior portion 508 of fuselage 504 comprises helical rod 532 connected to plate 534 and plate 536. In this illustrative example, helical rod 510 is comprised of section 540, section 542, section 544, section 546, and section 548 joined together to form helical rod 532.

Helical rod 532 is an example of a physical implementation of rail 300 shown in block form in FIG. 3. Plate 534 is connected to bulkhead 518, and plate 536 is connected to bulkhead 520. Plate 534 and plate 536 are examples of physical components for mounting system 302 shown in block form in FIG. 3. These plates can be connected to bulkhead 518 and bulkhead 520 using fasteners or other types of connecting mechanisms. As depicted in this example, helical rod 532 is centrally located within interior portion 508.

Inspection device 516 is connected to helical rod 510. Inspection device 538 is another example of an implementation for inspection device 304 shown in block form in FIG. 3. As depicted, inspection device 538 is configured to move along helical rod 532 and rotate about helical rod 532 to perform inspection operations to generate sensor data.

Figure 6:
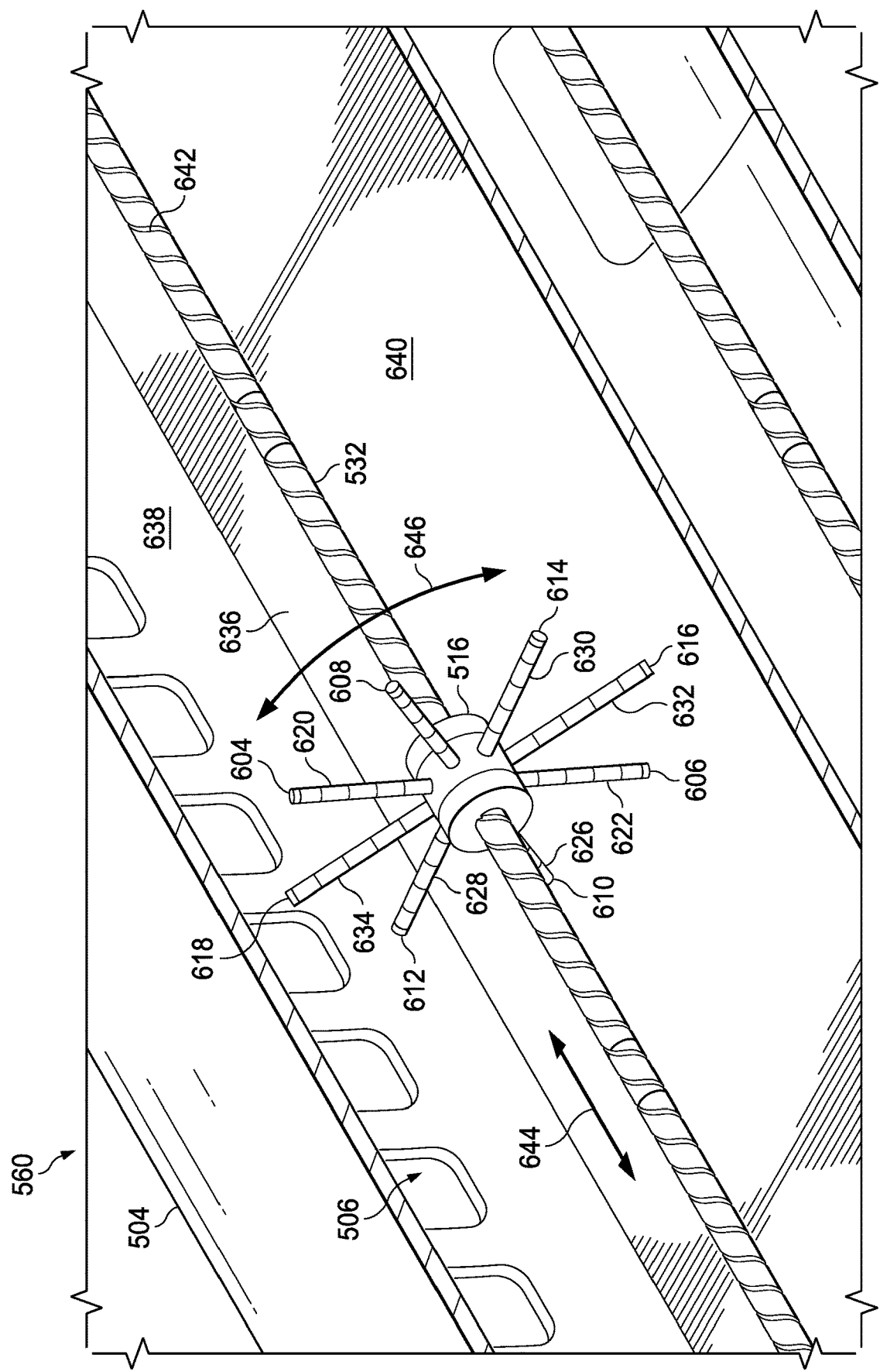
FIG. 6 is an illustration of an enlarged view of an inspection device in accordance with an illustrative embodiment.

An enlarged illustration of inspection device 516 in section 560 is shown in FIG. 6. Turning now to FIG. 6, an illustration of an enlarged view of inspection device is depicted in accordance with an illustrative embodiment. In this figure, an enlarged view of section 560 in FIG. 5 is depicted.

Inspection device 516 comprises housing 600 on which tools are connected via telescoping rods. Housing 600 is an example of a physical implementation for carriage 400 shown in block form in FIG. 4. In this example, housing 600 has a cylindrical shape.

In this illustrative example, the tools comprises visible light camera 604, visible light camera 606, thermographic camera 608, thermographic camera 610, eddy current probe 612, eddy current probe 614, ultrasound transducer array 616, and ultrasound transducer array 618.

As depicted, these tools are connected to the ends of the telescoping rods. In this illustrative example, visible light camera 604 is connected to telescoping rod 620, and visible light camera 606 is connected to telescoping rod 622. As depicted, thermographic camera 608 is connected to telescoping rod 624, and thermographic camera 610 is connected to telescoping rod 626. Eddy current probe 612 is connected to telescoping rod 628, and eddy current probe 614 is connected to telescoping rod 630. In the illustrative example, ultrasound transducer array 616 is connected to telescoping rod 632, and ultrasound transducer array 618 is connected to telescoping rod 634.

With the tools connected to the ends of the telescoping rods, the tools can be independently moved towards and away from surface 636 in interior portion 506 of fuselage 504. Surface 636 can include wall 638 of fuselage 504 and floor 640 in fuselage 504.

For example, telescoping rod 628 can move eddy current probe 612 to contact wall 638 in fuselage 504. The detection of eddy currents by an eddy current probe 612 can be used to determine whether corrosion is present within wall 638 of fuselage 504. As another example, telescoping rod 632 can move ultrasound transducer array 616 to contact to contact floor 640. Ultrasound transducer array 616 can be used to determine whether nonconformances such as voids, cracks, delamination, or other types of nonconformances are present within floor 640 in fuselage 504.

Further, a mobility system inside of housing 600 can engage helical groove 642 to move inspection device 516 axially along helical rod 532 in the direction of arrow 644. The mobility system inside of housing 600 can also rotate housing 600 in the direction of arrow 646.

Figure 7:
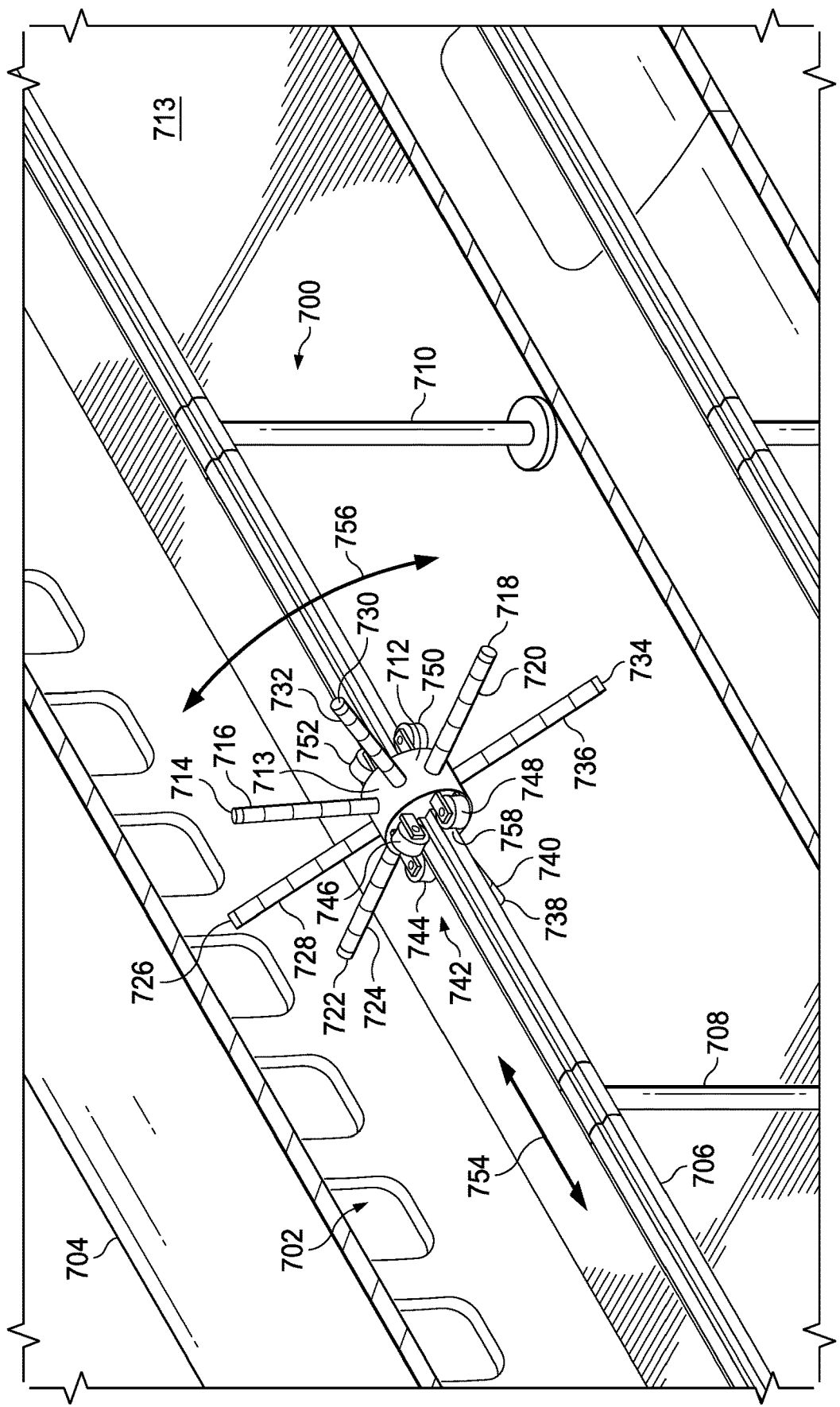
FIG. 7 is an illustration of a remote inspection system installed in the fuselage of an aircraft in accordance with an illustrative embodiment.

With reference now to FIG. 7, an illustration of a remote inspection system installed in the fuselage of an aircraft is depicted in accordance with an illustrative embodiment. In this illustrative example, remote inspection system 700 is installed within interior portion 702 of fuselage 704. As depicted, remote inspection system 700 comprises elongate bar 706, post 708, post 710, and inspection device 712.

In this illustrative example, elongate bar 706 has a T-shaped cross-section. Elongate bar 706 is an example of one physical implementation for rail 300 shown in block form in FIG. 3.

Elongate bar 706 is positioned centrally within interior portion 702 of fuselage 704 using post 708 and post 710. Post 708 and post 710 are examples of physical components that can be used to implement mounting system 302 shown in block form in FIG. 3. In this illustrative example, post 708 and post 710 are mounted on floor 715 within fuselage 704.

In this illustrative example, inspection device 712 is an example of a physical implementation for inspection device 304 shown in block form in FIG. 3. As depicted, housing 713 for remote inspection system 700 is an example of one implementation for carriage 400 shown in block form in FIG. 4. As depicted, housing 713 has a cylindrical shape.

In this illustrative example, telescoping rods are connected to housing 713 and tools are connected to the ends of the telescoping rods. As depicted, visible light camera 714 is connected telescoping rod 716, visible light camera 718 is connected to telescoping rod 720, and visible light camera 722 is connected to telescoping rod 724. Thermographic camera 726 is connected to telescoping rod 728, thermographic camera 730 is connected telescoping rod 732, thermographic camera 734 is connected telescoping rod 736, and thermographic camera 738 is connected telescoping rod 740.

As depicted, mobility system 742 includes wheel 744, wheel 746, wheel 748, wheel 750, and wheel 752. Another wheel hidden from view by elongate bar 706 is present. One or more of these wheels are motorized wheels enabling moving inspection device 712 in the direction of arrow 754. Further, mobility system 742 can also rotate housing 713 around elongate bar 706 in the direction of arrow 756. In this illustrative example, housing 713 includes gap 758 which enables housing 713 to move over and past post 708 and post 710.

Figure 8:
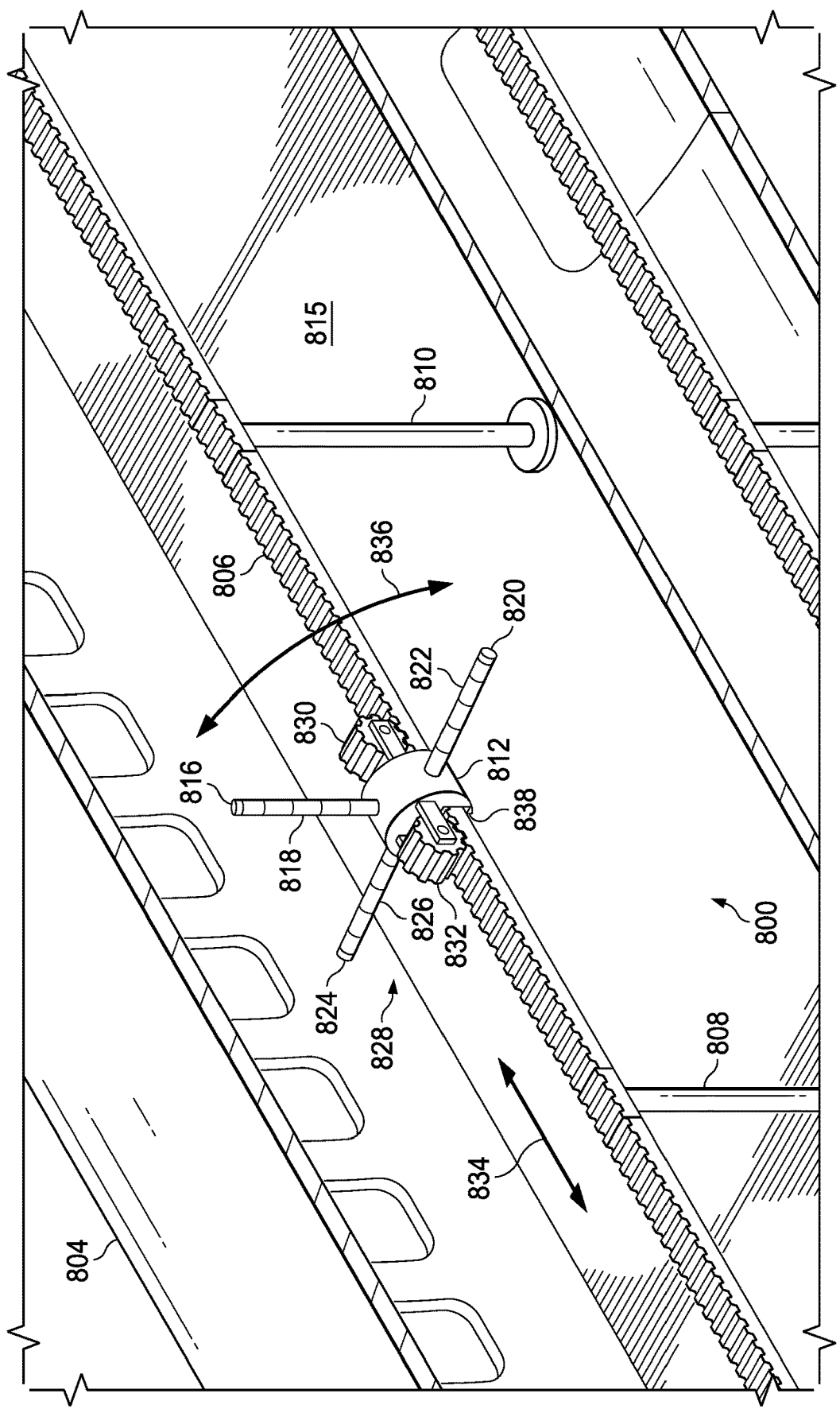
FIG. 8 is an illustration of a remote inspection system installed in the fuselage of an aircraft in accordance with an illustrative embodiment.

With reference now to FIG. 8, an illustration of a remote inspection system installed in the fuselage of an aircraft is depicted in accordance with an illustrative embodiment. In this illustrative example, remote inspection system 800 is installed within interior portion 802 of fuselage 804. As depicted, remote inspection system 800 comprises linear gear 806, post 808, post 810, and inspection device 812.

Linear gear 806 is positioned centrally within interior portion 802 of fuselage 804 using post 808 and post 810 mounted to floor 815. Linear gear 806 is an example of a physical implementation for rail 300 shown in block form in FIG. 3. Post 808 and post 810 are examples of physical components that can be used to implement mounting system 302 shown in block form in FIG. 3.

In this illustrative example, tools are connected to housing 814 through telescoping rods. As depicted, visible light camera 816 is connected to telescoping rod 818, visible light camera 820 is connected to telescoping rod 822, and visible light camera 824 is connected to telescoping rod 826.

In this illustrative example, mobility system 828 comprises circular gear 830 and circular gear 832. The circular gears are motorized and engage linear gear 806 to move inspection device 812 along the linear gear 806 in the direction of arrow 834. Mobility system 828 can also rotate housing 814 to rotate the different tools about linear gear 806 in the direction of arrow 836.

Housing 814 also includes gap 838 that enables inspection device 812 to move over and past post 808 and post 810.

The illustration of the remote inspection systems in FIGS. 5-8 are provided for purposes of illustrating some examples of how remote inspection system 214 shown in block form in FIG. 2 can be implemented. These illustrations are not meant to limit the manner in which other illustrative examples can be implemented.

For example, the housing 600 in FIG. 6 and housing 713 in FIG. 7 can have housings of shapes other than a cylindrical shape. For example, the housing could be a box shaped or some other shape. In yet other examples, a frame can be used instead of a housing.

Further, in another illustrative example, only visible light cameras can be used. As yet another example, fixed rods or elongate members can be used in place of telescoping rods. As another example, helical rod 510 in FIG. 5, helical rod 532 in FIG. 5, elongate bar 706 in FIG. 7, and linear gear 806 in FIG. 8 are examples of implementations for rail 300 shown in block form in FIG. 3 and are shown as being straight. Rails in other illustrative examples can be curved.

Figure 9:
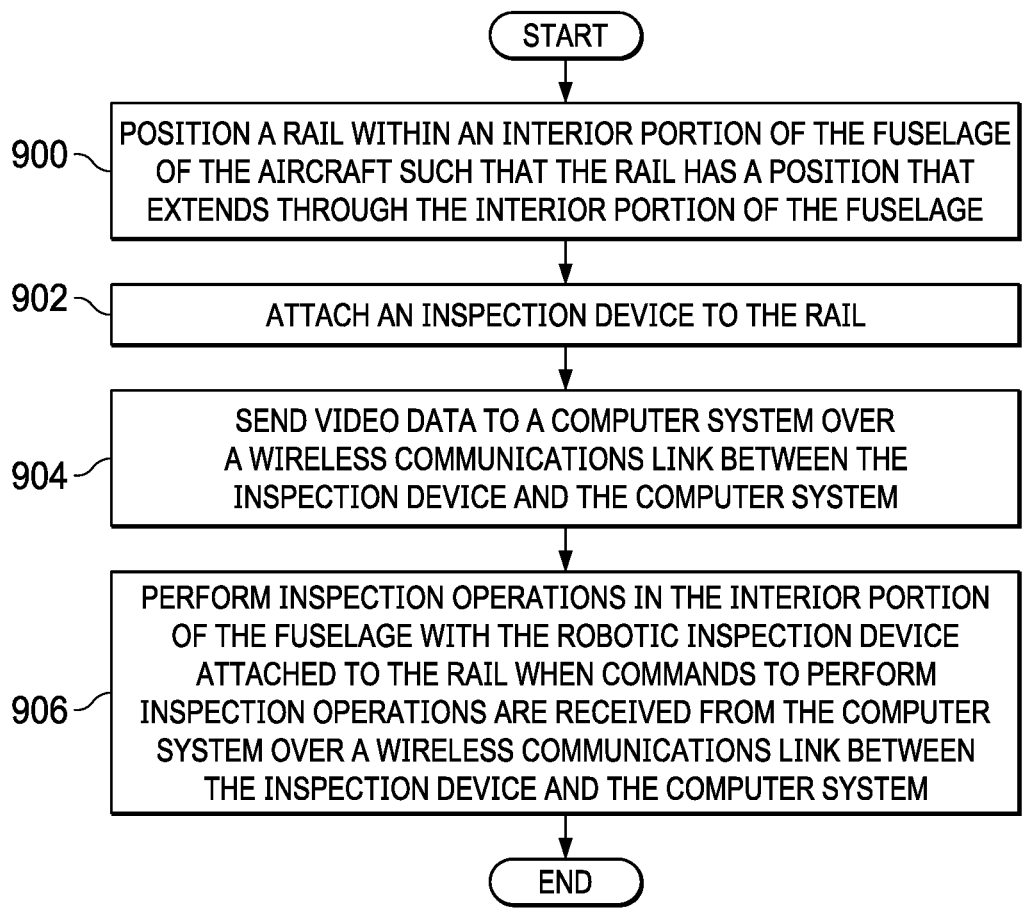
FIG. 9 is an illustration of a flowchart of a process for inspecting a fuselage of an aircraft in accordance with an illustrative embodiment.

Turning next to FIG. 9, an illustration of a flowchart of a process for inspecting a fuselage of an aircraft is depicted in accordance with an illustrative embodiment. The process in FIG. 9 can be implemented in hardware, software, or both. When implemented in software, the process can take the form of program code that is run by one of more processor units located in one or more hardware devices in one or more computer systems. For example, the process can be implemented in inspection system 202 in FIG. 2.

The process begins by positioning a rail within an interior portion of the fuselage of the aircraft such that the rail has a position that extends through the interior portion of the fuselage (operation 900). In this illustrative example, the rail can extend as far as physically possible within the interior portion of the fuselage, such as from one bulkhead to another bulkhead in the fuselage or from one open end to another open end of a fuselage that has not yet been assembled with other components to form the aircraft.

The interior portion in operation 900 can be a passenger area, a cargo area, or some other area within the fuselage of the aircraft. As another example, the interior portion can be the entire fuselage if a floor or other structure is not installed in the fuselage to partition the fuselage into more than one area.

The process attaches an inspection device to the rail (operation 902). In operation 902, the inspection device is configured to move along the rail linearly and about the rail rotationally when the inspection device is attached to the rail. The position of the rail is selected to enable the inspection device to inspect the interior portion of the fuselage.

The process sends video data to a computer system over a wireless communications link between the inspection device and the computer system (operation 904). The video data is displayed on a display system for the computer system. The process performs inspection operations in the interior portion of the fuselage with the robotic inspection device attached to the rail when commands to perform inspection operations are received from the computer system over a wireless communications link between the inspection device and the computer system (operation 906). The process terminates thereafter.

Figure 10:
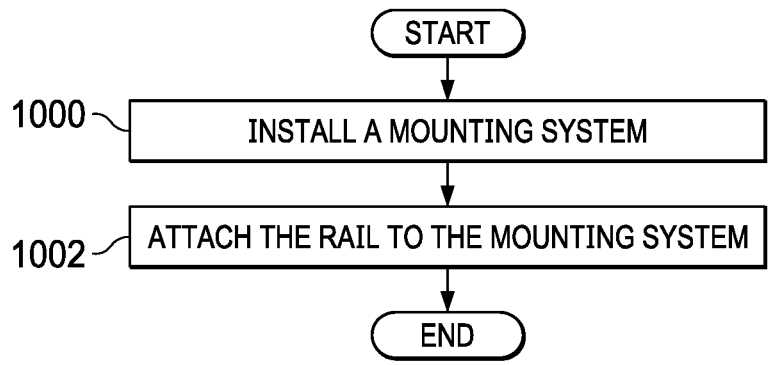
FIG. 10 is an illustration of a flowchart of a process for installing a remote inspection system in accordance with an illustrative embodiment.

With reference next FIG. 10, an illustration of a flowchart of a process for installing a remote inspection system is depicted in accordance with an illustrative embodiment. In this depicted example, the process can be performed by one or more human operators in inspection environment 200 to install remote inspection system 214 in interior portion 218 of fuselage 208 of aircraft 206 in FIG. 2.

The process begins by installing a mounting system (operation 1000). The mounting system is connected to at least one of the fuselage or a structure in a location in which the fuselage is located. For example, a mounting system can be installed within the fuselage or on the floor of the area in which the fuselage is being installed. In another example, if the mounting system is installed in aircraft, mounting system can be installed within the fuselage. If the fuselage is a component of the aircraft that has not yet been assembled with other components, the mounting system can be installed on floor or on other structures in the manufacturing facility.

The process attaches the rail to the mounting system (operation 1002). The process terminates thereafter. In operation 1002, the attachment of the rail to the mounting system is such that the rail has the position that extends through the interior portion of the fuselage when connected to the mounting system.

Figure 11:
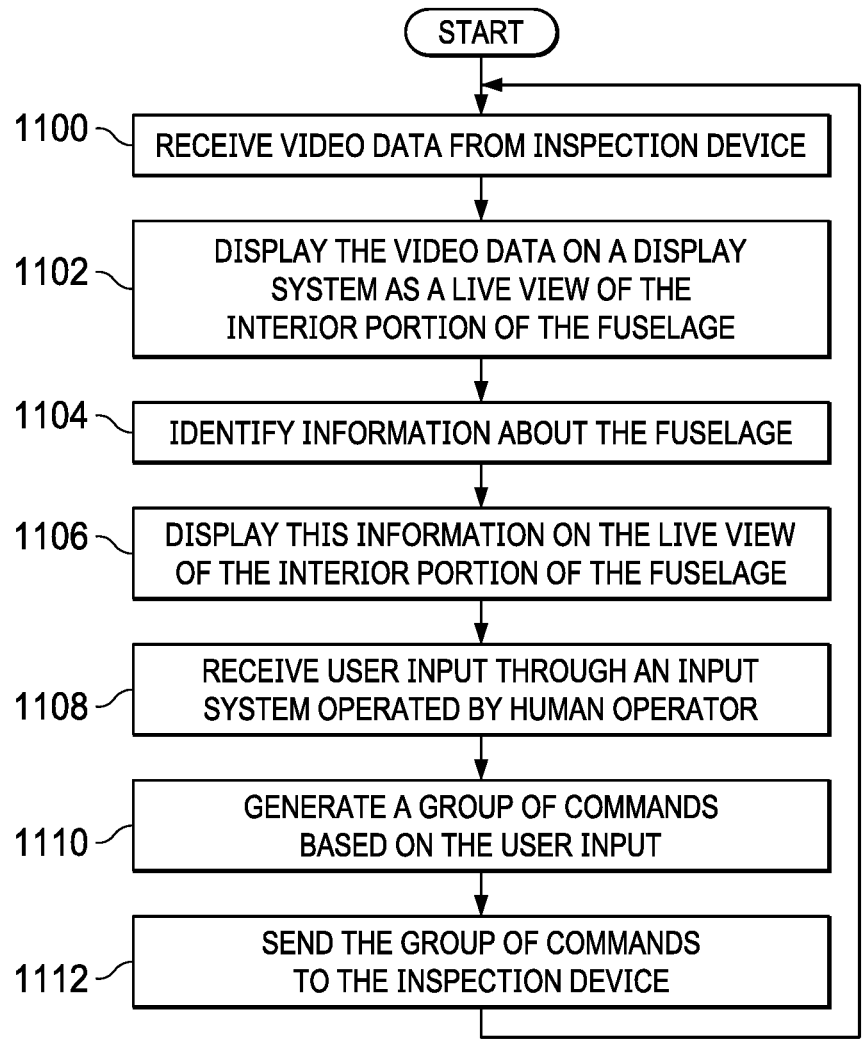
FIG. 11 is an illustration of a flowchart of a process for remotely controlling operation of an inspection device in accordance with an illustrative embodiment.

With reference next to FIG. 11, an illustration of a flowchart of a process for remotely controlling operation of an inspection device is depicted in accordance with an illustrative embodiment. The process in FIG. 11 can be implemented in hardware, software, or both. When implemented in software, the process can take the form of program code that is run by one of more processor units located in one or more hardware devices in one or more computer systems. The different operations can be implemented in the device manager 210 in computer system 212 in inspection system 202 in FIG. 2.

The process begins by receiving video data from inspection device (operation 1100). In operation 1100, inspection device is attached to a rail position in a fuselage of an aircraft for remote inspection.

The process displays the video data on a display system as a live view of the interior portion of the fuselage (operation 1102). The live view can be viewed by a human operator that is in a remote location to the location of the inspection device in the remote inspection system installed in the fuselage of the aircraft.

This interior portion can be the entire interior of fuselage that has not yet been assembled with other parts of aircraft. The interior portion also can be, for example, a passenger area or a cargo area in an aircraft that is already in service or being prepared for delivery to a customer.

The process identifies information about the fuselage (operation 1104). This information can be obtained from a database or other data structure. The information can include at least one of a diagram of components in the fuselage, a portion of a model of the fuselage, a work order, a prior scan of the fuselage, a graphical indicator on an inspection location in the interior portion of the fuselage, instructions for performing a particular type of inspection, or other suitable information.

The process displays this information on the live view of the interior portion of the fuselage (operation 1106). In this manner, an augmented reality view of the interior portion of the fuselage is provided to the human operator.

The process receives user input through an input system operated by human operator (operation 1108). The process generates a group of commands based on the user input (operation 1110). These commands are commands for the inspection device. The commands can include at least one of moving the inspection device along the rail, rotating the inspection device about the rail, activating an inspection tool connected to the inspection device to perform a test, moving the tool towards a wall of the fuselage, moving the inspection tool away from the wall of the fuselage, marking a nonconformance, sending sensor data to the computer system, or other suitable commands for performing the inspection of the interior portion of the fuselage.

The process then sends the group of commands to the inspection device (operation 1112). The process then returns to operation 1100. This process can be repeated any number of times during the inspection performed by human operator.

Figure 12:
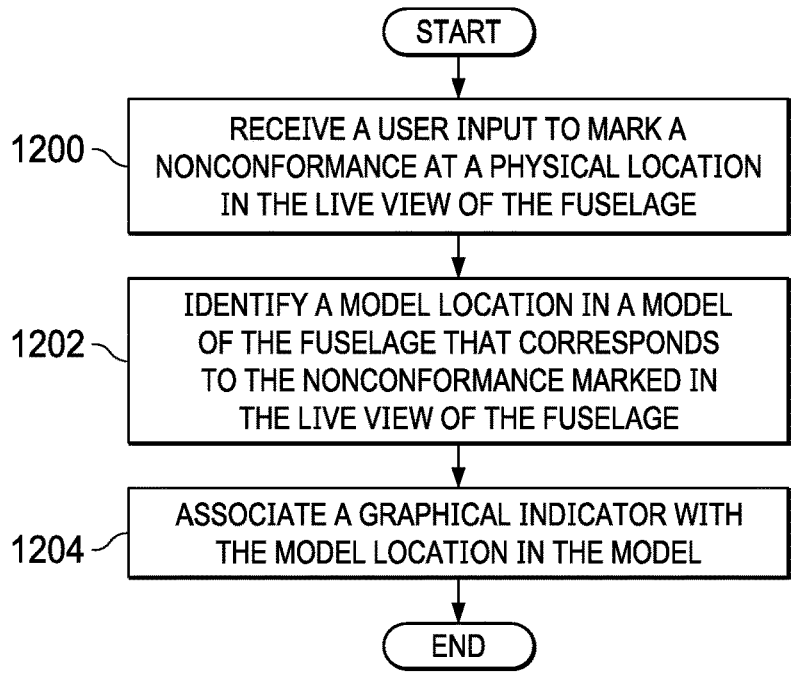
FIG. 12 is an illustration of a flowchart of a process for marking nonconformances in accordance with an illustrative embodiment.

With reference next to FIG. 12, an illustration of a flowchart process for marking nonconformances is depicted in accordance with an illustrative embodiment. The process in FIG. 12 can be implemented in hardware, software, or both. When implemented in software, the process can take the form of program code that is run by one of more processor units located in one or more hardware devices in one or more computer systems. For example, the process can be implemented in device manager 210 in computer system 212 in inspection system 202 in FIG. 2.

The process begins by receiving a user input to mark a nonconformance at a physical location in the live view of the fuselage (operation 1200). In this illustrative example, the user input can be an input selecting a portion of the video data displayed in the live view in which the nonconformance is seen by the human operator. The selection can be used identify a physical location on the fuselage where the nonconformance has been identified by human operator. This physical location is a three-dimensional location and can be described using coordinates for a coordinate system for the fuselage. The coordinate system can be a Cartesian coordinate system with a selected location in or outside of the aircraft being the origin.

The process identifies a model location in a model of the fuselage that corresponds to the nonconformance marked in the live view of the fuselage (operation 1202). In operation 1202, the process can transform the coordinate system for the fuselage into a coordinate system for the model and identify the location in the model corresponding to the location on the fuselage identified by human operator.

The process associates a graphical indicator with the model location in the model (operation 1204). The process terminates thereafter.

In operation 1204, the position identified in the physical location by the user input can be correlated to the coordinate system for the model to enable associating the graphical indicator with a position in the model that corresponds to physical position indicated by human operator in the user input. The position is a three-dimensional position described using coordinates in a coordinate system such as a Cartesian coordinate system.

Figure 13:
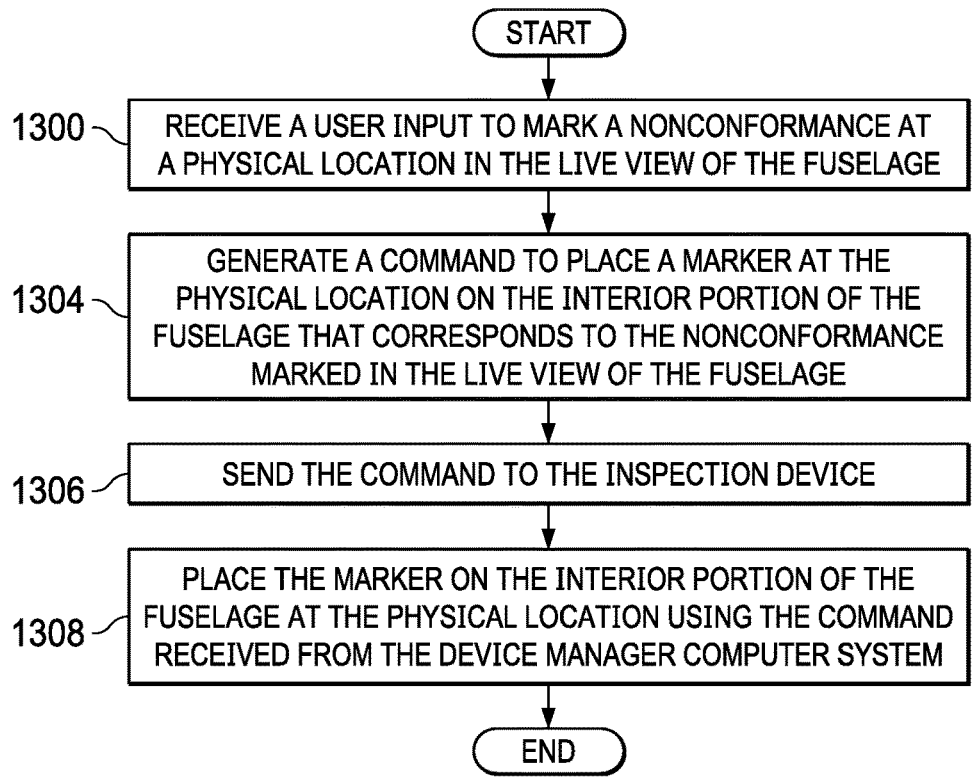
FIG. 13 is an illustration of a flowchart of a process for physically marking nonconformances in accordance with an illustrative embodiment.

With reference now to FIG. 13, an illustration of a flowchart process for physically marking nonconformances is depicted in accordance with an illustrative embodiment. The process in FIG. 13 can be implemented in hardware, software, or both. When implemented in software, the process can take the form of program code that is run by one of more processor units located in one or more hardware devices in one or more computer systems. For example, the process can be implemented in device manager 210 in computer system 212 in inspection system 202 in FIG. 2.

The process begins by receiving a user input to mark a nonconformance at a physical location of the live view of the fuselage (operation 1300). In this example, the user input can select a point in the live view where the human operator sees the nonconformance on the interior portion of the fuselage.

The process generates a command to place a marker at the physical location on the interior portion of the fuselage that corresponds to the nonconformance marked in the live view of the fuselage (operation 1304). The process can identify location on the fuselage on the user input. This location can be described in a coordinate system such as a Cartesian coordinate system for the aircraft.

The process sends the command to the inspection device (operation 1306). The inspection device places the marker on the interior portion of the fuselage at the physical location using the command received from the device manager computer system (operation 1308). The process terminates thereafter. In operation 1308, the marker can be a tape, a sticky note, an ink, a paint, or some other type of physical visual indicator that can be physically placed on physical location in the interior portion of the fuselage 208. As another example, a radio frequency identifier device can provide both a visual indication and a wireless indicator. The wireless indicator can include information such as coordinates of the nonconformance.

The flowcharts and block diagrams in the different depicted embodiments illustrate the architecture, functionality, and operation of some possible implementations of apparatuses and methods in an illustrative embodiment. In this regard, each block in the flowcharts or block diagrams can represent at least one of a module, a segment, a function, or a portion of an operation or step. For example, one or more of the blocks can be implemented as program code, hardware, or a combination of the program code and hardware. When implemented in hardware, the hardware can, for example, take the form of integrated circuits that are manufactured or configured to perform one or more operations in the flowcharts or block diagrams. When implemented as a combination of program code and hardware, the implementation may take the form of firmware. Each block in the flowcharts or the block diagrams can be implemented using special purpose hardware systems that perform the different operations or combinations of special purpose hardware and program code run by the special purpose hardware.

In some alternative implementations of an illustrative embodiment, the function or functions noted in the blocks may occur out of the order noted in the figures. For example, in some cases, two blocks shown in succession may be performed substantially concurrently, or the blocks may sometimes be performed in the reverse order, depending upon the functionality involved. Also, other blocks may be added in addition to the illustrated blocks in a flowchart or block diagram.

Figure 14:
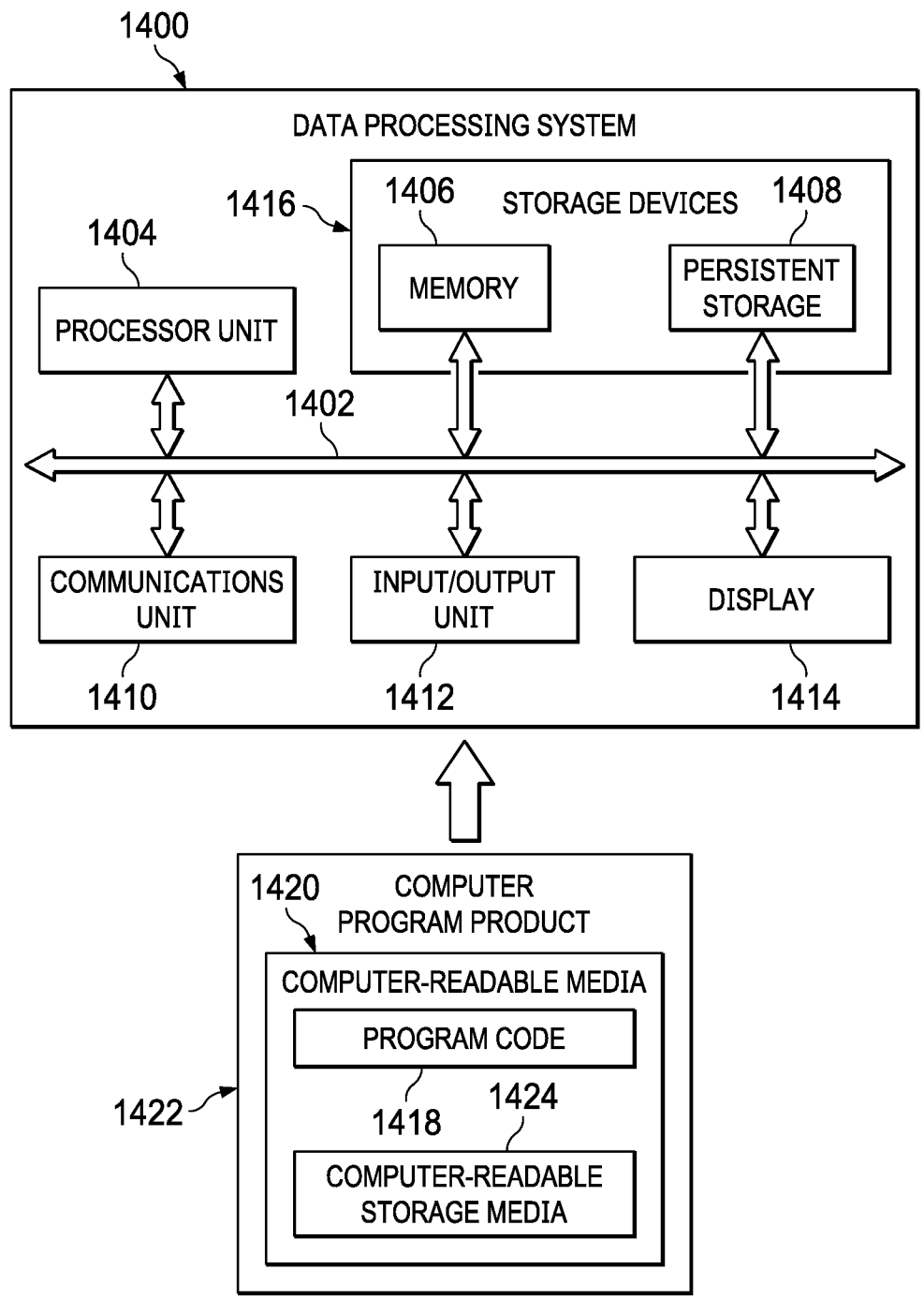
FIG. 14 is an illustration of a block diagram of a data processing system in accordance with an illustrative embodiment.

Turning now to FIG. 14, an illustration of a block diagram of a data processing system is depicted in accordance with an illustrative embodiment. Data processing system 1400 can be used to implement server computer 104, server computer 106, client devices 110, in FIG. 1. Data processing system 1400 can also be used to implement computer system 212 in FIG. 2. In this illustrative example, data processing system 1400 includes communications framework 1402, which provides communications between processor unit 1404, memory 1406, persistent storage 1408, communications unit 1410, input/output (I/O) unit 1412, and display 1414. In this example, communications framework 1402 takes the form of a bus system.

Processor unit 1404 serves to execute instructions for software that can be loaded into memory 1406. Processor unit 1404 includes one or more processors. For example, processor unit 1404 can be selected from at least one of a multicore processor, a central processing unit (CPU), a graphics processing unit (GPU), a physics processing unit (PPU), a digital signal processor (DSP), a network processor, or some other suitable type of processor.

Memory 1406 and persistent storage 1408 are examples of storage devices 1416. A storage device is any piece of hardware that is capable of storing information, such as, for example, without limitation, at least one of data, program code in functional form, or other suitable information either on a temporary basis, a permanent basis, or both on a temporary basis and a permanent basis. Storage devices 1416 may also be referred to as computer-readable storage devices in these illustrative examples. Memory 1406, in these examples, can be, for example, a random-access memory or any other suitable volatile or non-volatile storage device. Persistent storage 1408 can take various forms, depending on the particular implementation.

For example, persistent storage 1408 may contain one or more components or devices. For example, persistent storage 1408 can be a hard drive, a solid-state drive (SSD), a flash memory, a rewritable optical disk, a rewritable magnetic tape, or some combination of the above. The media used by persistent storage 1408 also can be removable. For example, a removable hard drive can be used for persistent storage 1408.

Communications unit 1410, in these illustrative examples, provides for communications with other data processing systems or devices. In these illustrative examples, communications unit 1410 is a network interface card.

Input/output unit 1412 allows for input and output of data with other devices that can be connected to data processing system 1400. For example, input/output unit 1412 can provide a connection for user input through at least one of a keyboard, a mouse, or some other suitable input device. Further, input/output unit 1412 can send output to a printer. Display 1414 provides a mechanism to display information to a user.

Instructions for at least one of the operating system, applications, or programs can be located in storage devices 1416, which are in communication with processor unit 1404 through communications framework 1402. The processes of the different embodiments can be performed by processor unit 1404 using computer-implemented instructions, which can be located in a memory, such as memory 1406.

These instructions are referred to as program code, computer usable program code, or computer-readable program code that can be read and executed by a processor in processor unit 1404. The program code in the different embodiments can be embodied on different physical or computer-readable storage media, such as memory 1406 or persistent storage 1408.

Program code 1418 is located in a functional form on computer-readable media 1420 that is selectively removable and can be loaded onto or transferred to data processing system 1400 for execution by processor unit 1404. Program code 1418 and computer-readable media 1420 form computer program product 1422 in these illustrative examples. In the illustrative example, computer-readable media 1420 is computer-readable storage media 1424.

In these illustrative examples, computer-readable storage media 1424 is a physical or tangible storage device used to store program code 1418 rather than a medium that propagates or transmits program code 1418.

Alternatively, program code 1418 can be transferred to data processing system 1400 using a computer-readable signal media. The computer-readable signal media can be, for example, a propagated data signal containing program code 1418. For example, the computer-readable signal media can be at least one of an electromagnetic signal, an optical signal, or any other suitable type of signal. These signals can be transmitted over connections, such as wireless connections, optical fiber cable, coaxial cable, a wire, or any other suitable type of connection.

The different components illustrated for data processing system 1400 are not meant to provide architectural limitations to the manner in which different embodiments can be implemented. In some illustrative examples, one or more of the components may be incorporated in or otherwise form a portion of, another component. For example, memory 1406, or portions thereof, can be incorporated in processor unit 1404 in some illustrative examples. The different illustrative embodiments can be implemented in a data processing system including components in addition to or in place of those illustrated for data processing system 1400. Other components shown in FIG. 14 can be varied from the illustrative examples shown. The different embodiments can be implemented using any hardware device or system capable of running program code 1418.

Figure 15:
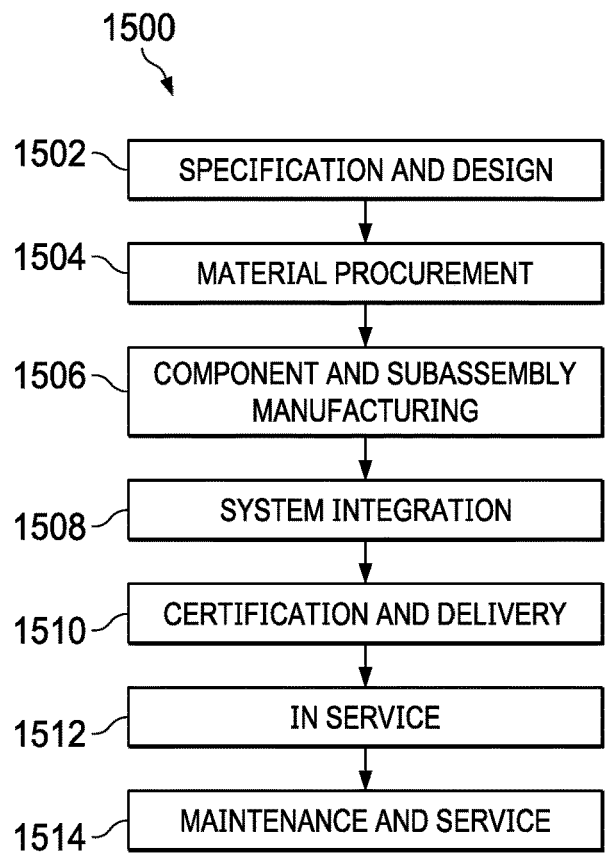
FIG. 15 is an illustration of an aircraft manufacturing and service method in accordance with an illustrative embodiment.
Figure 16:
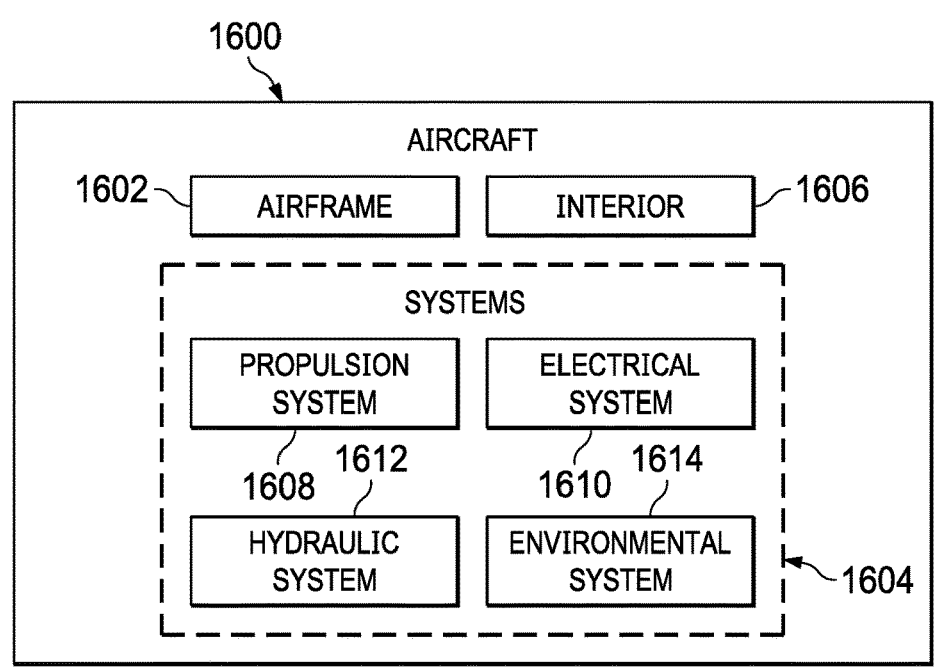
FIG. 16 is an illustration of a block diagram of an aircraft in which an illustrative embodiment may be implemented.

Illustrative embodiments of the disclosure may be described in the context of aircraft manufacturing and service method 1500 as shown in FIG. 15 and aircraft 1600 as shown in FIG. 16. Turning first to FIG. 15, an illustration of an aircraft manufacturing and service method is depicted in accordance with an illustrative embodiment. During pre-production, aircraft manufacturing and service method 1500 may include specification and design 1502 of aircraft 1600 in FIG. 16 and material procurement 1504.

During production, component and subassembly manufacturing 1506 and system integration 1508 of aircraft 1600 in FIG. 16 takes place. Thereafter, aircraft 1600 in FIG. 16 can go through certification and delivery 1510 in order to be placed in service 1512. While in service 1512 by a customer, aircraft 1600 in FIG. 16 is scheduled for routine maintenance and service 1514, which may include modification, reconfiguration, refurbishment, and other maintenance or service.

Each of the processes of aircraft manufacturing and service method 1500 may be performed or carried out by a system integrator, a third party, an operator, or some combination thereof. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 16, an illustration of an aircraft is depicted in which an illustrative embodiment may be implemented. In this example, aircraft 1600 is produced by aircraft manufacturing and service method 1500 in FIG. 15 and may include airframe 1602 with plurality of systems 1604 and interior 1606. Examples of systems 1604 include one or more of propulsion system 1608, electrical system 1610, hydraulic system 1612, and environmental system 1614. Any number of other systems may be included. Although an aerospace example is shown, different illustrative embodiments may be applied to other industries, such as the automotive industry.

Apparatuses and methods embodied herein may be employed during at least one of the stages of aircraft manufacturing and service method 1500 in FIG. 15.

In one illustrative example, components or subassemblies produced in component and subassembly manufacturing 1506 in FIG. 15 can be fabricated or manufactured in a manner similar to components or subassemblies produced while aircraft 1600 is in service 1512 in FIG. 15. As yet another example, one or more apparatus embodiments, method embodiments, or a combination thereof can be utilized during production stages, such as component and subassembly manufacturing 1506 and system integration 1508 in FIG. 15. One or more apparatus embodiments, method embodiments, or a combination thereof may be utilized while aircraft 1600 is in service 1512, during maintenance and service 1514 in FIG. 15, or both. For example, inspection system 202 in FIG. 2 can be used to inspect a fuselage in airframe 1602 in FIG. 16 during at least one of component and subassembly manufacturing 1506 and system integration 1508. Inspection system 202 can also be used during maintenance and service 1504 to inspect the fuselage in airframe 1602 in aircraft 1600. The use of a number of the different illustrative embodiments may substantially expedite the assembly of aircraft 1600, reduce the cost of aircraft 1600, or both expedite the assembly of aircraft 1600 and reduce the cost of aircraft 1600. For example, inspections can be performed more quickly by enabling inspectors to remotely inspect aircraft without having to travel to the aircraft for inspections.

Figure 17:
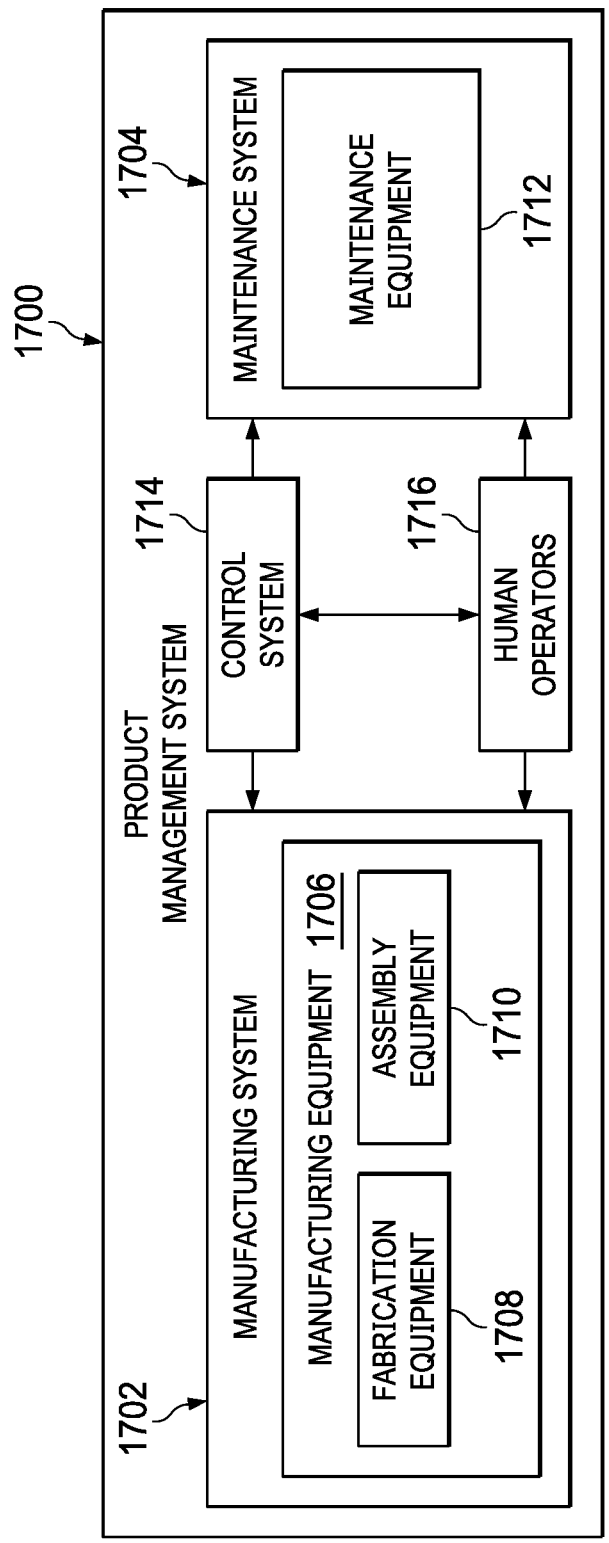
FIG. 17 is an illustration of a block diagram of a product management system in accordance with an illustrative embodiment.

Turning now to FIG. 17, an illustration of a block diagram of a product management system is depicted in accordance with an illustrative embodiment. Product management system 1700 is a physical hardware system. In this illustrative example, product management system 1700 includes at least one of manufacturing system 1702 or maintenance system 1704.

Manufacturing system 1702 is configured to manufacture products, such as aircraft 1600 in FIG. 16. As depicted, manufacturing system 1702 includes manufacturing equipment 1706. Manufacturing equipment 1706 includes at least one of fabrication equipment 1708 or assembly equipment 1710.

Fabrication equipment 1708 is equipment that used to fabricate components for parts used to form aircraft 1600 in FIG. 16. For example, fabrication equipment 1708 can include machines and tools. These machines and tools can be at least one of a drill, a hydraulic press, a furnace, a mold, a composite tape laying machine, a vacuum system, a lathe, or other suitable types of equipment. Fabrication equipment 1708 can be used to fabricate at least one of metal parts, composite parts, semiconductors, circuits, fasteners, ribs, skin panels, spars, antennas, or other suitable types of parts.

Assembly equipment 1710 is equipment used to assemble parts to form aircraft 1600 in FIG. 16. In particular, assembly equipment 1710 is used to assemble components and parts to form aircraft 1600 in FIG. 16. Assembly equipment 1710 also can include machines and tools. These machines and tools may be at least one of a robotic arm, a crawler, a faster installation system, a rail-based drilling system, or a robot. Assembly equipment 1710 can be used to assemble parts such as seats, horizontal stabilizers, wings, engines, engine housings, landing gear systems, and other parts for aircraft 1600 in FIG. 16. In this illustrative example, assembly equipment 1710 can also include equipment, such as remote inspection system 214, to perform inspections for components and parts that are assembled to form aircraft 1600. For example, remote inspection system 214 can be used to inspect fuselage sections or a fuselage for aircraft 1600.

In this illustrative example, maintenance system 1704 includes maintenance equipment 1712. Maintenance equipment 1712 can include any equipment needed to perform maintenance on aircraft 1600 in FIG. 16. Maintenance equipment 1712 may include tools for performing different operations on parts on aircraft 1600 in FIG. 16. These operations can include at least one of disassembling parts, refurbishing parts, inspecting parts, reworking parts, manufacturing replacement parts, or other operations for performing maintenance on aircraft 1600 in FIG. 16. These operations can be for routine maintenance, inspections, upgrades, refurbishment, or other types of maintenance operations.

In the illustrative example, maintenance equipment 1712 may include ultrasonic inspection devices, x-ray imaging systems, vision systems, drills, crawlers, and other suitable devices. In some cases, maintenance equipment 1712 can include fabrication equipment 1708, assembly equipment 1710, or both to produce and assemble parts that needed for maintenance. Maintenance equipment 1712 can also include equipment, such as remote inspection system 214, to perform inspections as part of maintenance aircraft 1600. For example, remote inspection system 214 can be used to inspect fuselage sections or a fuselage for aircraft 1600.

Product management system 1700 also includes control system 1714. Control system 1714 is a hardware system and may also include software or other types of components. Control system 1714 is configured to control the operation of at least one of manufacturing system 1702 or maintenance system 1704. In particular, control system 1714 can control the operation of at least one of fabrication equipment 1708, assembly equipment 1710, or maintenance equipment 1712.

The hardware in control system 1714 can be implemented using hardware that may include computers, circuits, networks, and other types of equipment. The control may take the form of direct control of manufacturing equipment 1706. For example, robots, computer-controlled machines, and other equipment can be controlled by control system 1714. In other illustrative examples, control system 1714 can manage operations performed by human operators 1716 in manufacturing or performing maintenance on aircraft 1600. For example, control system 1714 can assign tasks, provide instructions, display models, or perform other operations to manage operations performed by human operators 1716. In these illustrative examples, device manager 210 in FIG. 2 can be implemented in control system 1714 to manage at least one of the manufacturing or maintenance of aircraft 1600 in FIG. 16.

In the different illustrative examples, human operators 1716 can operate or interact with at least one of manufacturing equipment 1706, maintenance equipment 1712, or control system 1714. This interaction can occur to manufacture aircraft 1600 in FIG. 16.

Of course, product management system 1700 may be configured to manage other products other than aircraft 1600 in FIG. 16. Although product management system 1700 has been described with respect to manufacturing in the aerospace industry, product management system 1700 can be configured to manage products for other industries. For example, product management system 1700 can be configured to manufacture products for the automotive industry as well as any other suitable industries.

Thus, illustrative examples provide a method, apparatus, and system for inspecting aircraft structures such as a fuselage of an aircraft. In one illustrative example, a fuselage of an aircraft is inspected. In this process, a rail is positioned within an interior portion of the fuselage of the aircraft such that the rail extends through the interior portion of the fuselage. An inspection device is attached to the rail. The inspection device moves along the rail, and the position of the rail enables the inspection device to inspect the interior portion. Video data is sent to a computer system over a wireless communications link between the inspection device and the computer system. The video data is displayed on a display system for the computer system. Inspection operations are performed in the interior portion of the fuselage with the inspection device attached to the rail when commands to perform inspection operations are received from the computer system over a wireless communications link between the inspection device and the computer system.

In one illustrative example, one or more solutions are present that overcome a problem with the manner in which inspections such as visual inspections are currently performed on aircraft when a limited number of inspectors that are trained or experienced and are available to travel to the locations where aircraft maintenance for aircraft manufacturing is performing visual inspection of aircraft. One or more solutions in the illustrative examples can reduce or eliminate travel time needed by an inspector to inspect aircraft.

In the illustrative example, one or more technical solutions are present in which an inspector can remotely inspect an aircraft using remote inspection system 214. Remote inspection system 214 can be assembled and installed by personnel at the location. The inspector can operate inspection device 304 in remote inspection system 214 perform inspection operations without needing to be present the location fuselage to perform the inspection.

As a result, the use of inspection system 214 can enable performing remote inspections in which it is unnecessary for inspectors to travel to each site for inspections such that at least one of a need for additional inspectors or inspection cycle time is reduced. Further, aircraft availability can be increased and maintenance down time reduced by using remote inspection system 214.

The description of the different illustrative embodiments has been presented for purposes of illustration and description and is not intended to be exhaustive or limited to the embodiments in the form disclosed. The different illustrative examples describe components that perform actions or operations. In an illustrative embodiment, a component can be configured to perform the action or operation described. For example, the component can have a configuration or design for a structure that provides the component an ability to perform the action or operation that is described in the illustrative examples as being performed by the component.

Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method for inspecting a fuselage of an aircraft, the method comprising:
   positioning a rail within an interior portion of the fuselage of the aircraft such that the rail extends through the interior portion of the fuselage;
   attaching an inspection device to the rail, wherein the inspection device moves along the rail, wherein a position of the rail enables the inspection device to inspect the interior portion;
   sending video data to a computer system over a wireless communications link between the inspection device and the computer system, wherein the video data is displayed on a display system for the computer system, wherein the video data is a live view of the fuselage;
   performing inspection operations in the interior portion of the fuselage with the inspection device attached to the rail when a group of commands to perform inspection operations are received from the computer system over a wireless communications link between the inspection device and the computer system; and
   receiving a user input to mark a nonconformance at a physical location in the live view of the fuselage.

2. The method of claim 1 further comprising:
   generating the group of commands to perform the inspection operations at the computer system based on user input received at the computer system.

3. The method of claim 1, wherein positioning the rail within the interior portion of the fuselage of the aircraft such that the rail has the position such that the rail extends through the interior portion of the fuselage comprises:
   attaching the rail to a mounting system that is connected at least one of the fuselage or a structure in a location in which the fuselage is located such that the rail has the position such that the rail extends through the interior portion of the fuselage.

4. The method of claim 1, further comprising:
   identifying a model location in a model of the fuselage that corresponds to the nonconformance marked in the live view of the fuselage; and
   associating a graphical indicator with the model location in the model.

5. The method of claim 1, further comprising:
   generating a command to place a marker at the physical location on the interior portion of the fuselage that corresponds to the nonconformance marked in the live view of the fuselage; and sending the command to the inspection device, wherein the inspection device places the marker on the interior portion of the fuselage at the physical location.

6. The method of claim 1, wherein the rail is selected from one of a rod with a helical groove and a track.

7. The method of claim 2, wherein the group of commands is selected from at least one of move the inspection device along the rail, rotate the inspection device about the rail, activate a group of inspection tools connected to the inspection device to perform a test, move an inspection tool towards a wall of the fuselage, move the inspection tool away from the wall of the fuselage, or send sensor data to the computer system.

8. The method of claim 7, wherein the group of inspection tools is selected from at least one of a visible light camera, an x-ray system, an ultrasound transducer array, a thermographic camera, or an eddy current probe.

9. The method of claim 1, wherein the position of the rail is such that the rail extends centrally through the interior portion of the fuselage.

10. The method of claim 1, wherein the interior portion of the fuselage is one of a passenger area and a cargo area.

11. An aircraft inspection system comprising:
    a rail;
    a mounting system that holds the rail in a position within an interior portion of a fuselage of an aircraft such that the rail extends through the interior portion of the fuselage;
    an inspection device moveably attached to the rail, wherein the inspection device is linearly moveable along the rail and rotatably moveable about the rail and wherein the inspection device operates to generate sensor data in response to receiving a group of commands; and a computer system in a location remote to the inspection device, wherein the computer system is in communication with the inspection device and wherein the computer system receives video data from the inspection device, displays the video data on a display system, wherein the video data is a live view of the fuselage, generates the group of commands based on a user input received from a human operator at the computer system, sends the group of commands to the inspection device, receive the sensor data from the inspection device and receives a second user input from the human operator at the computer system to mark a nonconformance at a physical location in the live view of the fuselage.

12. The aircraft inspection system of claim 11, wherein the computer system displays the live view of the fuselage and information about the fuselage on the display system as an augmented reality display of the fuselage.

13. The aircraft inspection system of claim 12, wherein the computer system:
  identifies a model location in a model of the fuselage that corresponds to the nonconformance marked in the live view of the fuselage; and
  associates a graphical indicator with the model location in the model.

14. The aircraft inspection system of claim 11, wherein the computer system:
  generates a command to place a marker at the physical location on the interior portion of the fuselage that corresponds to the nonconformance marked in the live view of the fuselage; and
  sends the command to the inspection device, wherein the inspection device places the marker on the interior portion of the fuselage at the physical location.

15. The aircraft inspection system of claim 12, wherein the information about the fuselage is selected from at least one of a diagram of components in the fuselage, a portion of a model of the fuselage, a work order, a prior scan of the fuselage, or a graphical indicator on an inspection location in the interior portion of the fuselage.

16. The aircraft inspection system of claim 11, wherein the mounting system is connected to at least one of the fuselage or a structure in a location in which the rail has the position such that rail extends through the interior portion of the fuselage.

17. The aircraft inspection system of claim 11, wherein the rail is selected from one of a rod with a helical groove and a track.

18. The aircraft inspection system of claim 11, wherein the group of commands is selected from at least one of move the inspection device along the rail, rotate the inspection device about the rail, activate an inspection tool connected to the inspection device to perform a test, move the inspection tool towards a wall of the fuselage, move the inspection tool away from the wall of the fuselage, or send the sensor data to the computer system.

19. The aircraft inspection system of claim 11, wherein the inspection device comprises:
  a carriage that is moveably attached to the rail, wherein the carriage is linearly moveable along the rail and rotatably moveable about the rail; and
  a group of inspection tools.

20. The aircraft inspection system of claim 19, wherein the group of inspection tools is selected from at least one of a visible light camera, an x-ray system, an ultrasound transducer array, a thermographic camera, or an eddy current probe.

21. The aircraft inspection system of claim 11, wherein the position of the rail is such that the rail extends centrally through the interior portion of the fuselage.

22. The aircraft inspection system of claim 11, wherein the interior portion of the fuselage is one of a passenger area and a cargo area.

23. An aircraft inspection system comprising:
  a rail;
    a mounting system that holds the rail in a position within an interior portion of a fuselage of an aircraft such that the rail extends through the interior portion of the fuselage; and
    an inspection device moveably attached to the rail, wherein the inspection device is linearly moveable along the rail and rotatably moveable about the rail and wherein the inspection device operates to generate sensor data for the interior portion of the fuselage.

* * * * *